US006305563B1

(12) United States Patent
Elliott

(10) Patent No.: US 6,305,563 B1
(45) Date of Patent: *Oct. 23, 2001

(54) ONE-PIECE DISPENSING STRUCTURE AND METHOD AND APPARATUS FOR MAKING SAME

(75) Inventor: John Elliott, Jefferson, WI (US)

(73) Assignee: AptarGroup, Inc,, Crystal Lake, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/229,254

(22) Filed: Jan. 12, 1999

(51) Int. Cl.⁷ ............................ B65D 41/00; B65D 43/16; B65D 51/22
(52) U.S. Cl. ......................... 215/235; 220/258; 220/259; 220/837; 222/556; 264/255; 264/328.7; 264/328.8
(58) Field of Search .................................. 264/255, 328.1, 264/328.7, 328.8, 328.12; 220/254, 256, 259, 258, 810, 831, 836, 837, 839; 222/556, 562, 546; 215/235, 237

(56) References Cited

U.S. PATENT DOCUMENTS

| T904,007 | 11/1972 | Garner . |
| 3,737,292 | 6/1973 | Segmuller . |
| 3,767,742 | 10/1973 | Robin . |

(List continued on next page.)

FOREIGN PATENT DOCUMENTS 0 570 276 A1   11/1993  (EP) .

OTHER PUBLICATIONS

International Search Report of corresponding International Application PCT/US00/00196.
U.S. patent application Ser. No. 09/001,151, filed Dec. 30, 1997.
U.S. patent application Ser. No. 08/680,251, filed Jul. 11, 1996.
Brochure from Incoe Corporation entitled "Co–Injection Systems" (1977).
"Multigate Co–Injection for Rigid Container," Kortec, Inc.
"Coinjection Molding With Automotive Polyolefins," Bruce R. Denison, *D & S Plastics International.*
"Conference explores options of coinjection," Bill Bregar, *Plastics News,* Dec. 9, 1996, p. 11.
"Engle press displays Kortec's technology," *Plastics News,* Jul. 14, 1997.
"Coinjection boosts barrier properties of PET bottles," Michael C. Gabriele, *Modern Plastics,* Sep. 1997.
"Multi–material injection saves time, while cutting costs," Peter Mapleston, *Modern Plastics,* Mar. 1994.
"Molding Many Parts Into One," Jay Rosenberg, *PD & D,* Dec. 1995.

(List continued on next page.)

*Primary Examiner*—Allan N. Shoap
*Assistant Examiner*—Niki M. Eloshway
(74) *Attorney, Agent, or Firm*—Rockey, Milnamow & Katz, Ltd.

(57) ABSTRACT

A one-piece dispensing structure is molded by a process combining a co-injection molding first phase with a bi-injection molding second phase. In the first phase, a skin material and core material are co-injected into a mold cavity first region to form most of the major portion of the closure body. Subsequently, a movable shut-off member is retracted to expose an intermediate region which (1) is adjacent the closure structure hinge area and which (2) establishes communication between the mold cavity first region and another part of the mold cavity defining the closure lid portion. The skin material is injected through a second gate directly into the cavity intermediate region to fill the cavity intermediate region and the closure lid portion of the mold cavity. The skin material in the cavity intermediate region bonds to the previously injected skin material in the cavity first region adjacent the closure hinge.

4 Claims, 14 Drawing Sheets

U.S. PATENT DOCUMENTS

| | | |
|---|---|---|
| 3,825,637 | 7/1974 | Robin . |
| 3,972,664 | 8/1976 | Fillmann . |
| 4,035,466 | 7/1977 | Langecker . |
| 4,052,497 | 10/1977 | Monnet . |
| 4,106,887 | 8/1978 | Yasuike et al. . |
| 4,157,883 | 6/1979 | Mares . |
| 4,174,413 | 11/1979 | Yasuike et al. . |
| 4,245,976 | 1/1981 | Arnason . |
| 4,289,468 | 9/1981 | von Holdt . |
| 4,335,068 | 6/1982 | Hemery . |
| 4,416,602 | 11/1983 | Neumeister . |
| 4,459,257 | 7/1984 | Vaciu . |
| 4,470,936 | 9/1984 | Potter . |
| 4,489,844 | 12/1984 | Breskin . |
| 4,554,190 | 11/1985 | McHenry et al. . |
| 4,609,516 | 9/1986 | Krishnakumar et al. . |
| 4,610,621 | 9/1986 | Taber . |
| 4,657,496 | 4/1987 | Ozeki et al. . |
| 4,710,118 | 12/1987 | Krishnakumar et al. . |
| 4,715,802 | 12/1987 | Arai . |
| 4,722,449 * | 2/1988 | Dubach ................................ 215/235 |
| 4,767,312 | 8/1988 | Hüttner . |
| 4,781,954 | 11/1988 | Krishnakumar et al. . |
| 4,795,043 | 1/1989 | Odet et al. . |
| 4,798,697 | 1/1989 | Nohara et al. . |
| 4,807,769 | 2/1989 | Gach . |
| 4,821,899 | 4/1989 | Nyez et al. . |
| 4,897,032 | 1/1990 | Corteggiani . |
| 4,957,682 * | 9/1990 | Kobayashi et al. ................... 264/255 |
| 4,990,301 | 2/1991 | Krishnakumar et al. . |
| 5,000,992 | 3/1991 | Kelch . |
| 5,037,285 | 8/1991 | Kudert et al. . |
| 5,098,274 | 3/1992 | Krishnakumar et al. . |
| 5,167,896 | 12/1992 | Hirota et al. . |
| 5,198,177 | 3/1993 | Sugiyama et al. . |
| 5,221,507 | 6/1993 | Beck et al. . |
| 5,254,306 | 10/1993 | Inada et al. . |
| 5,287,983 * | 2/1994 | Reil et al. ............................ 220/258 |
| 5,332,113 | 7/1994 | Kusler, III et al. . |
| 5,392,938 | 2/1995 | Dubach . |
| 5,395,590 | 3/1995 | Swaniger et al. . |
| 5,439,124 | 8/1995 | Mock . |
| 5,558,239 | 9/1996 | Dubach . |
| 5,651,998 * | 7/1997 | Bertschi et al. ................. 264/255 X |
| 5,667,819 | 9/1997 | Eckardt . |
| 5,755,360 | 5/1998 | Elliott . |
| 5,769,277 | 6/1998 | Elliott . |
| 5,865,335 * | 2/1999 | Farrell et al. ........................ 220/270 |
| 5,935,614 | 8/1999 | Blank et al. . |
| 5,935,615 | 8/1999 | Gellert et al. . |
| 5,950,848 | 9/1999 | Baudin . |
| 5,975,381 | 11/1999 | Revenu . |
| 5,992,668 * | 11/1999 | Elliott ................................. 220/278 |
| 6,030,567 | 2/2000 | Takeuchi . |
| 6,056,142 * | 5/2000 | Elliott ................................. 220/278 |
| 6,099,780 * | 8/2000 | Gellert ................................ 264/255 |
| 6,138,854 * | 10/2000 | Kaneko et al. ...................... 220/254 |

OTHER PUBLICATIONS

"Through The Hopper Manufacturing—New Company moves coinjection from the machine to the mold," *Injection Molding Magazine*, May 1996.

"Co–Injection Molding: Current Applications," paper presented to the Plastics Product Design & Development Forum, Chicago, IL, May 31–Jun. 2, 1998 by Joseph McRoskey, Co–Mack Technology, Inc.

Demag illustration.

* cited by examiner

ONE-PIECE DISPENSING STRUCTURE AND METHOD AND APPARATUS FOR MAKING SAME

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

This invention relates to a closure system for dispensing a product from a container and to a method and apparatus for making it. The invention is more particularly related to such a system incorporating two materials: an outer skin material and an inner barrier layer material.

BACKGROUND OF THE INVENTION

AND

TECHNICAL PROBLEMS POSED BY THE PRIOR ART

A variety of packages, including dispensing packages or containers, have been developed for personal care products such as shampoo, lotions, etc., as well as for other materials. Such containers typically have a neck defining an open upper end on which is mounted a dispensing closure.

One type of dispensing closure which has been proposed for these kinds of containers has a dispensing spout initially closed with a barrier membrane which can be opened by piercing or puncturing the membrane. The closure has a body which is adapted to be mounted to the container and which includes the spout defining a dispensing orifice. The orifice is initially sealed closed with a tamper-evident, puncturable membrane that is molded unitary with the closure body.

The closure also includes a lid for closing over the closure body, and includes a hinge connecting the lid to the closure body to accommodate movement of the lid between (1) a closed position covering the dispensing spout orifice, and (2) an open position spaced away from the closed position. The membrane can be punctured by pushing down on a flexible, domed portion of the lid so as to force a piercing member on the underside of the lid through the membrane to open the dispensing orifice.

It would be generally desirable to connect the lid to the closure body with a relatively inexpensive, yet effective, unitary hinge having a high cycle life. Such a hinge would preferably include a relatively thin section of material capable of accommodating the opening and closing movement of the lid without damage or failure over the contemplated life of the closure. Such a hinge should preferably accommodate incorporation of a "snap-action" design of the conventional type described in U.S. Pat. No. 5,642,824.

Such snap-action hinges, or other non-snap-action film hinges, are preferably molded as a unitary structure with the body and lid from a suitable thermoplastic material that will accommodate the hinge flexure without failure over the life of the package or container on which the closure is mounted, and one suitable thermoplastic material which has been found to work well is polypropylene.

In some applications, a polypropylene closure having a molded, pierceable membrane seal across the dispensing orifice may not provide sufficient barrier characteristics prior to the piercing of the membrane. For example, some products are sensitive to oxygen, such as food products or pharmaceutical products that might degrade or suffer deleterious effects when exposed to a sufficient quantity of oxygen for a long enough period of time. Such products may be packaged in containers made from a material or materials that are good barriers to gases such as oxygen and carbon dioxide. However, a polypropylene closure with a membrane seal for such a container has a relatively high permeability to oxygen and carbon dioxide compared to some other thermoplastic materials. Thus, a polypropylene closure with a membrane seal may permit the undesirable permeation of ambient oxygen through the unopened closure into the container during the period of time when the container full of product is transported and stored prior to use. This can decrease the shelf life of the product. Similarly, a product gas in the container, such as carbon dioxide, could diffuse through the unopened polypropylene closure over time.

A closure can be molded from a material having a much lower permeability to oxygen and carbon dioxide, such as polyethylene naphthalate or ethylene vinyl alcohol. Such materials, while providing a significant permeation barrier to oxygen ingress, can also provide a significant permeation barrier to carbon dioxide egress (as from a carbonated beverage in a container on which the closure is mounted).

However, polyethylene naphthalate or ethylene vinyl alcohol are more expensive materials than polypropylene. Further, polyethylene naphthalate and ethylene vinyl alcohol are not as flexible as polypropylene. Thus, a closure having a body, hinge, and lid which are molded together as a unitary structure from polyethylene naphthalate or ethylene vinyl alcohol may not function satisfactorily over the contemplated life of the closure because the hinge may prematurely fail.

It would be desirable to provide an improved one-piece closure which could be molded, at least in substantial part, from a less expensive material, such as polypropylene providing sufficient flexibility for the hinge, and which could include a minimal amount of a second material in the closure body that would provide a sufficient oxygen barrier.

It would also be advantageous if an improved process could be provided for molding such a closure in an efficient and economical manner.

It would be especially desirable to combine a co-injection molding process with a bi-injection molding process to produce the closure so as to minimize the overall cost of mold fabrication, operation, and maintenance for a single mold and operating machinery compared to using a separate co-injection mold and a separate bi-injection mold with separate operating machinery.

Further, it would be desirable if such a process, and improved apparatus for effecting the process, could accommodate efficient, high-quality, large-volume manufacturing with a reduced product reject rate.

The present invention provides a one-piece dispensing system or closure, and method and apparatus for making the dispensing system.

BRIEF SUMMARY OF THE INVENTION

The present invention provides a process and apparatus for molding a closure having a unitary construction of components, and an aspect of the invention also includes such a closure molded according to the process of the invention. The closure includes a body, a lid, and a hinge connecting the body to the lid.

At least the closure body includes a skin material which encapsulates, or at least substantially surrounds, a core material. Preferably, the core material provides a permeation barrier to gas from within the container or to gas exterior of the container. At least a portion of the hinge and lid are molded from either the skin material or the core material. However, if the core material is a relatively brittle and/or rigid barrier material, at least a portion of the hinge is preferably molded solely from a more flexible skin material along with the lid.

According to one aspect of the process, the process includes the steps of:

(A) providing a closed, single mold having a cavity that defines the configuration of the closure components with the closure lid open and that has a first region defining the configuration of at least a portion of the body, a second region defining the configuration of the lid and at least a portion of the hinge, and a third region joining the mold cavity first and second regions;

(B) injecting a flowable skin material from a supply of the flowable skin material through a first gate into the mold cavity first region while closing off communication through the mold cavity third region between the mold cavity first and second regions;

(C) during at least a portion of step (B), co-injecting a flowable core material through the first gate along with the skin material to fill the mold cavity first region with the core material substantially surrounded by the skin material;

(D) after step (C), terminating the flow of at least the core material;

(E) establishing communication between the mold cavity first and second regions through the mold cavity third region;

(F) opening a second gate communicating directly between the supply of the flowable skin material and either the mold cavity second or third regions;

(G) injecting the skin material from the supply of flowable skin material through the second gate to fill the mold cavity second and third regions;

(H) terminating the injection of the skin material after the mold cavity second and third regions are filled with the skin material and allowing the skin material in a portion of the mold cavity third region to bond to the skin material in the mold cavity first region at an interface between the mold cavity first and third regions; and (I) opening the mold cavity to release the molded closure.

According to another aspect of the invention, the process includes the steps of:

(A) providing a closed, single mold having (1) a first region defining the configuration of at least a first portion of the closure (which first portion may be a portion of the closure body in the preferred embodiment), (2) a second region defining the configuration of a second portion of the closure (which second portion may include (i) a lid for engaging the body, and (ii) at least a portion of a hinge connecting the body with the lid), and (3) a third region joining the first and second regions;

(B) injecting a first material (which first material may be a skin material in the preferred embodiment) from a supply of the first material through a first gate into the mold cavity first region while closing off communication through the mold cavity third region between the mold cavity first and second regions;

(C) during at least a portion of step (B), co-injecting a flowable second material (which second material may be a core material in the preferred embodiment) from a supply of the second material through the first gate along with the first material to fill the mold cavity first region with the second material substantially surrounded by the first material;

(D) after step (C), terminating the flow of at least the second material;

(E) establishing communication between the mold cavity first and second regions through the mold cavity third region;

(F) opening a second gate communicating directly between (1) a selected one of the supplies of the first and second materials, and (2) a selected one of the mold cavity second and third regions;

(G) injecting the selected one of the first and second materials from the selected one of the supplies of first and second materials through the second gate to fill the mold cavity second and third regions;

(H) terminating the injection of the selected one of the first and second materials after the mold cavity second and third regions are filled with the selected one of the first and second materials and allowing the selected one of the first and second materials in the mold cavity third region to bond to the first material in the mold cavity first region at an interface between the mold cavity first and third regions; and (I) opening the mold to release the molded closure.

According to another aspect of the invention, the process includes the steps of:

(A) providing a closed, single mold having a cavity that defines the configuration of the closure components with the closure lid open and that has a first region defining the configuration of at least a portion of the closure body, a second region defining the configuration of the closure lid and at least a portion of the hinge, and a third region joining the mold cavity first and second regions;

(B) providing an injection inner nozzle for accommodating flow of a flowable core material and providing a co-injection outer nozzle for accommodating flow of a flowable skin material alone and for alternatively accommodating flow of the core material together within the skin material;

(C) providing a first gate from the co-injection outer nozzle into the mold cavity first region, and providing a second gate from the co-injection outer nozzle into a selected one of the mold cavity second and third regions;

(D) injecting the flowable skin material from a supply of the flowable skin material within the outer nozzle through the outer nozzle and the first gate into the mold cavity first region while closing off communication through the mold cavity third region between the mold cavity first and second regions;

(E) during at least a portion of step (D), co-injecting the flowable core material through the inner nozzle, the outer nozzle, and the first gate along with the skin material to fill the mold cavity first region with the core material substantially surrounded by the skin material;

(F) after step (E), terminating the flow of at least the core material;

(G) establishing communication between the mold cavity first and second regions through the mold cavity third region;

(H) opening the second gate;

(I) injecting said skin material from the supply of flowable skin material within the outer nozzle through the second gate to fill the mold cavity second and third regions;

(J) terminating the injection of the skin material after the mold cavity second and third regions are filled with the skin material and allowing the skin material in a portion of the mold cavity third region to bond to the skin material in the mold cavity first region at an interface between the mold cavity first and third regions; and (K) opening the mold cavity to release the molded closure.

According to another aspect of the invention, the process includes the steps of:

(A) providing a closed, single mold having a cavity that defines the configuration of the closure components with the closure lid open and that has a first region defining the configuration of at least a portion of the body, a second region defining the configuration of the lid and at least a portion of the hinge, and a third region joining the mold cavity first and second regions;

(B) injecting a flowable skin material from a supply of the flowable skin material through a first gate into the mold cavity first region while positioning a movable shut-off member in an extended position in the mold cavity third region to close off communication through the mold cavity third region between the mold cavity first and second regions;

(C) during at least a portion of step (B), co-injecting a flowable core material through the first gate along with the skin material to fill the mold cavity first region with the core material substantially surrounded by the skin material;

(D) after step (C), terminating the flow of at least the core material;

(E) withdrawing the shut-off member to a retracted position in which communication is established between the mold cavity first and second regions through the mold cavity third region;

(F) opening a second gate communicating directly between the supply of the flowable skin material and one of the mold cavity second and third regions (in a preferred embodiment, the second gate is a passage that (i) communicates directly between the supply of flowable skin material and the mold cavity third region, and (ii) is occluded by the shut-off member when the shut-off member is in the extended position, and this step (F) may be effected in the preferred embodiment simultaneously with step (E) by withdrawing the shut-off member away from the second gate as well as away from the mold cavity third region);

(G) injecting said skin material from the supply of flowable skin material through the second gate to fill the mold cavity second and third regions;

(H) terminating the injection of the skin material after the mold cavity second and third regions are filled with the skin material and allowing the skin material in a portion of the mold cavity third region to bond to the skin material in the mold cavity first region at an interface between the mold cavity first and third regions; and (I) opening the mold cavity to release the molded closure.

According to yet another aspect of the invention, the process includes the steps of:

(A) providing a closed, single mold having a cavity that defines the configuration of the closure components with the closure lid open and that has a first region defining the configuration of at least a portion of the body, a second region defining the configuration of the lid and at least a portion of the hinge, and a third region joining the mold cavity first and second regions;

(B) providing an injection inner nozzle for accommodating flow of a flowable core material and providing a co-injection outer nozzle for accommodating flow of a flowable skin material alone and for alternatively accommodating flow of the core material together within the skin material;

(C) providing a first gate from the co-injection outer nozzle into said mold cavity first region, and providing a second gate from the co-injection outer nozzle directly to one of the mold cavity second and third regions;

(D) providing a dual function shut-off member that is movable between (1) an extended position in the mold cavity third region to occlude the second gate and to close off communication through the mold cavity third region between the mold cavity first and second regions, and (2) a retracted position opening the second gate and establishing communication through the mold cavity third region between the mold cavity first and second regions;

(E) injecting the flowable skin material from a supply of the flowable skin material from within the outer nozzle through the outer nozzle and first gate into the mold cavity first region while the shut-off member is in the extended position;

(F) during at least a portion of step (E), co-injecting the flowable core material through the inner nozzle and the outer nozzle first gate along with the skin material to fill the mold cavity first region with the core material surrounded by the skin material;

(G) after step (E), terminating the flow of at least the core material;

(H) withdrawing the shut-off member to the retracted position (in the preferred embodiment, the shut-off member has a distal end corresponding to the as-molded exterior shape of the closure in the mold cavity third region);

(I) injecting the skin material from the supply of flowable skin material from within the outer nozzle through the second gate to fill the mold cavity second and third regions;

(J) terminating the injection of the skin material after the mold cavity second and third regions are filled with the skin material and allowing the skin material in a portion of the mold cavity third region to bond to the skin material in the mold cavity first region at an interface between the mold cavity first and third regions; and (K) opening the mold cavity to release the molded closure.

According to another aspect of the invention, apparatus is provided for molding a closure having a unitary construction. The apparatus includes a mold which when closed has a first region defining the configuration of at least a first portion of the closure, a second region defining the configuration of a second portion of the closure, and a third region joining the first and second regions. The mold includes means for opening and closing the mold. Means are provided for selectively closing off and opening communication between the mold cavity first and second regions through the mold cavity third region. The apparatus includes a first gate to the mold cavity first region, means for injecting a first material from a supply of the first material through the first gate into the mold cavity first region, and means for co-injecting a flowable second material from a supply of the second material through the first gate along with the first material to fill the mold cavity first region with the second material substantially surrounded by the first material. A second gate communicates directly between (1) a supply of one of the first and second materials, and (2) one of the mold cavity second and third regions. Means are provided for selectively opening and closing the second gate, and the apparatus includes means for injecting a selected one of the first and second materials through the second gate when the second gate is opened to fill the mold cavity second and third regions whereby the selected one of the first and second materials in the mold cavity third region bonds to the first material in the mold cavity first region at an interface between the mold cavity first and third regions.

In another aspect of the invention, apparatus is provided for molding a closure having a unitary construction of components which include a body, a lid, and a hinge connecting the body to the lid. The apparatus includes a single mold which when closed has a cavity that defines the configuration of the closure components with the lid open and that has a first region defining the configuration of at least a portion of the body, a second region defining the configuration of the lid and at least a portion of the hinge, and a third region joining the mold cavity first and second regions. The mold includes means for opening and closing the mold. An injection inner nozzle is provided for accommodating flow of a flowable core material, and a co-injection outer nozzle is provided for accommodating flow of a flowable skin material alone and alternatively accommodating flow of the core material together within the skin material. The apparatus includes a first gate from the co-injection outer nozzle to the mold cavity first region. There is also a second gate from the co-injection outer nozzle to one of the mold cavity second and third regions and means for selectively opening and closing the second gate. Means are also provided for selectively closing off and opening communication through the mold cavity third region between the mold cavity first and second regions. Means are also provided for injecting the flowable skin material from a supply of the flowable skin material from within the outer nozzle through the outer nozzle and first gate into the mold cavity first region. The apparatus includes means for co-injecting the flowable core material through the inner nozzle, the outer nozzle, and first gate along with the skin material to fill the mold cavity first region with the core material substantially surrounded by the skin material. Also, means are provided for injecting the skin material from a supply of flowable skin material from within the outer nozzle through the second gate when opened to fill the mold cavity second and third regions whereby the skin material in a portion of the mold cavity third region bonds to the skin material in the mold cavity first region at an interface between the mold cavity first and third regions.

The invention includes yet another aspect of the apparatus for molding a closure having a unitary construction of components which include a body, a lid, and a hinge connecting the body to the lid. Specifically, the apparatus includes a single mold including means for opening and closing the mold which when closed has a cavity that defines the configuration of the closure components with the lid open and that has a first region defining the configuration of at least a portion of the body, a second region defining the configuration of the lid and at least a portion of the hinge, and a third region joining the mold cavity first and second regions. There is a first gate to the mold cavity first region, and means for injecting a flowable skin material from a supply of the flowable skin material through the first gate. There is a second gate communicating directly between a supply of the flowable skin material and one of the mold cavity second and third regions. A shut-off member is movable between (1) an extended position in the mold cavity third region to close off communication through the mold cavity third region between the mold cavity first and second regions, and (2) a retracted position in which communication is established between the mold cavity first and second regions through the mold cavity third region. The apparatus includes means for co-injecting a flowable core material through the first gate along with the skin material to fill the mold cavity first region with the core material substantially surrounded by the skin material, and also includes means for injecting the skin material from a supply of flowable skin material through the second gate to fill the mold cavity second and third regions whereby the skin material in a portion of the mold cavity third region bonds to the skin material in the mold cavity first region at an interface between the mold cavity first and third regions. In the preferred embodiment, the second gate is a passage that (1) communicates directly between a supply of flowable skin material and the mold cavity third region, and (2) is occluded by the shut-off member when the shut-off member is in the extended position.

The invention includes another aspect of the apparatus for molding a closure having a unitary construction of components which include a body, a lid, and a hinge connecting the body to the lid. The apparatus includes a single mold including means for opening and closing the mold which when closed has a cavity that defines the configuration of the closure components with the lid open and that has a first region defining the configuration of at least a portion of the body, a second region defining the configuration of the lid and at least a portion of the hinge, and a third region joining the mold cavity first and second regions. The apparatus includes an injection inner nozzle for accommodating flow of a flowable core material and a co-injection outer nozzle for accommodating flow of a flowable skin material alone and for alternatively accommodating flow of the core material together with, and within, the skin material. There is a first gate from the co-injection outer nozzle to the mold cavity first region, and there is a second gate for establishing communication between a supply of the skin material and the mold cavity third region. The apparatus includes a dual function shut-off member that is movable between (1) an extended position in the mold cavity third region to occlude the second gate and to close off communication through the mold cavity third region between the mold cavity first and second regions, and (2) a retracted position opening the second gate and establishing communication between the mold cavity first and second regions through the mold cavity third region. In the preferred embodiment, the shut-off member has a distal end corresponding to a portion of the as-molded exterior shape of the closure in the mold cavity third region.

Yet another aspect of the invention includes a closure made by a unique process to create a unitary construction of components which include a body, a lid, and a hinge connecting the body to the lid. The closure is made by the process comprising the following steps:

(A) providing a closed, single mold having a cavity that defines the configuration of the closure components with the lid open and that has a first region defining the configuration of at least a portion of the body, a second region defining the configuration of the lid and at least a portion of the hinge, and a third region joining the mold cavity first and second regions;

(B) injecting a flowable skin material from a supply of the flowable skin material through a first gate into the mold cavity first region while closing off communication through the mold cavity third region between the mold cavity first and second regions;

(C) during at least a portion of step (B), co-injecting a flowable core material through the first gate along with the skin material to fill the mold cavity first region with the core material substantially surrounded by the skin material;

(D) after step (C), terminating the flow of at least the core material;

(E) establishing communication between the mold cavity first and second regions through the mold cavity third region;

(F) opening a second gate communicating directly between the supply of the flowable skin material and one of the mold cavity second and third regions;

(G) injecting the skin material from the supply of flowable skin material through the second gate to fill the mold cavity second and third regions;

(H) terminating the injection of the skin material after the mold cavity second and third regions are filled with the skin material and allowing the skin material in a portion of the mold cavity third region to bond to the skin material in the mold cavity first region at an interface between the mold cavity first and third regions; and (I) opening the mold cavity to release the molded closure.

Finally, another aspect of the invention includes a closure having a unitary construction and made by a unique process comprising the following steps:

(A) providing a closed, single mold having a first region defining the configuration of at least a first portion of the closure, a second region defining the configuration of a second portion of the closure, and a third region joining the first and second regions;

(B) injecting a first material from a supply of the first material through a first gate into the mold cavity first region while closing off communication through the mold cavity third region between the mold cavity first and second regions;

(C) during at least a portion of step (B), co-injecting a flowable second material from a supply of the second material through the first gate along with the first material to fill the mold cavity first region with the second material substantially surrounded by the first material;

(D) after step (C), terminating the flow of at least the second material;

(E) establishing communication between the mold cavity first and second regions through the mold cavity third region;

(F) opening a second gate communicating directly between (1) a selected one of the supplies of the first and second materials, and (2) a selected one of the mold cavity second and third regions;

(G) injecting the selected one of the first and second materials from the selected one of the supplies of first and second materials through the second gate to fill the mold cavity second and third regions;

(H) terminating the injection of the selected one of the first and second materials after the mold cavity second and third regions are filled with the selected one of the first and second materials and allowing the selected one of the first and second materials in the mold cavity third region to bond to the first material in the mold cavity first region at an interface between the mold cavity first and third regions; and (I) opening the mold to release the molded closure. In the preferred embodiment, the first material is a skin material,
the second material is a core material, and steps (E) and (F) are effected simultaneously. Further, in the preferred embodiment, the first portion of the closure includes at least a portion of a body of the closure, and the second portion of the closure includes (1) a lid for engaging the body, and (2) at least a portion of a hinge connecting the body with the lid.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 shows the closure with the lid open;

FIG. 3A shows the beginning of the co-injection fill phase for the closure body cavity wherein the skin material begins to flow into the body cavity region which is isolated from the closure lid cavity region by an extended shut-off member.

FIG. 6 shows (1) the shut-off pin in the fully extended position to close the discharge orifice of the core material inner nozzle and discharge orifice of the skin material outer nozzle, and (2) the shut-off member extended to close off the closure lid cavity region;

DESCRIPTION OF THE PREFERRED EMBODIMENTS

Figure 1:
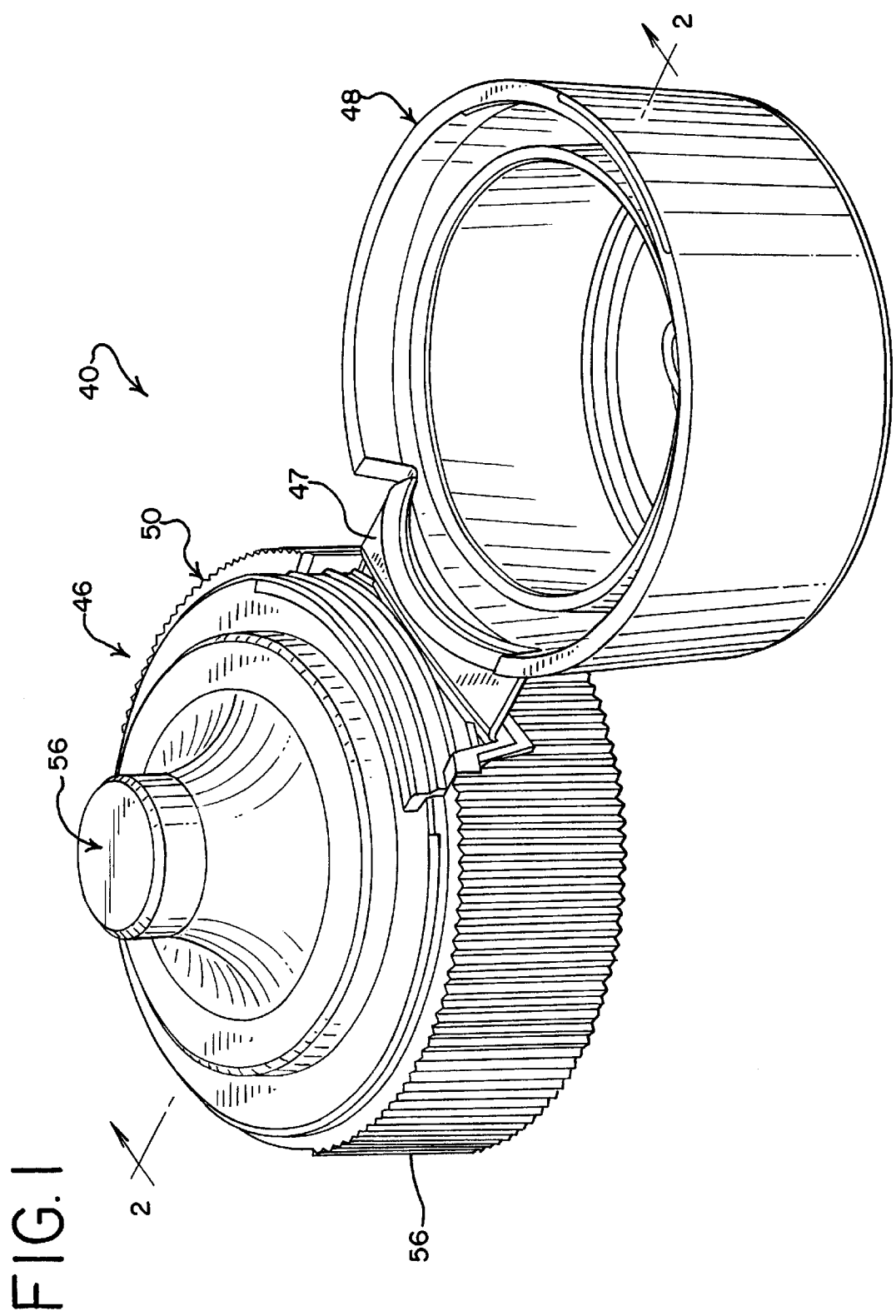
FIG. 1 is a perspective view of an embodiment of a closure molded according to one form of the process of the present invention.

While this invention is susceptible of embodiment in many different forms, this specification and the accompanying drawings disclose only some specific forms as examples of the invention. The invention is not intended to be limited to the embodiments so described, and the scope of the invention will be pointed out in the appended claims.

For ease of description, the apparatus components of this invention, and the inventive closure molded thereby, are described in various positions, and terms such as upper, lower, horizontal, etc., are used with reference to these positions. It will be understood, however, that the closure and apparatus components may have positions other than the ones described.

With reference to the figures, a first embodiment of a closure of the present invention is illustrated in FIGS. 1, 2, 2A, and 2B and is represented generally in the figures by reference numeral 40. The closure 40 is adapted to be disposed on a conventional or special container (not illustrated) which has a mouth or opening. The container may include a hollow body and may or may not have a neck which extends from the container and defines the opening. If the container includes a neck, then the neck may have (but need not have) a circular cross-sectional configuration, and the body of the container may have another cross-sectional configuration, such as an oval cross-sectional shape, for example. The closure 40 has a shape adapted to be mounted to the container around the opening. In the preferred embodiment illustrated, the closure 40 is adapted to be mounted to a container having a circular opening.

The container may be stored and used in an orientation wherein the closure 40 is at the top of the container. The container may also be normally stored in an inverted position (not illustrated). When stored in the inverted position, the container employs the closed closure 40 as a support base.

The container would typically be a squeezable container having a flexible wall or walls which can be grasped by the user and compressed to increase the internal pressure within the container so as to squeeze the product out of the container through the closure (after the closure is opened as explained in detail hereinafter). The container wall typically has sufficient, inherent resiliency so that when the squeezing forces are removed, the container wall returns to its normal, unstressed shape.

The closure 40 is molded from a synthetic, thermoplastic, polymer material, or other materials, compatible with the container contents. The closure 40 includes a body 46 and a lid 48.

The closure body 46 includes a base 50 and discharge spout 59 with a tamper-evident seal or membrane 54. In the embodiment illustrated in FIGS. 1 and 2, the base 50 includes an annular wall or skirt 56 which may have suitable connecting means (e.g., a conventional thread 55 (FIG. 2) or conventional snap-fit bead (not illustrated)) for engaging suitable cooperating means, such as a thread or bead on the container to secure the closure body 46 to the container. The closure body 46 and container could also be welded together by induction melting or ultrasonic melting.

Near the top of the annular wall 56, the closure base 50 has an annular deck 57 (FIG. 2) which is adapted to extend over the upper, distal end of the container when the closure 40 is mounted on the container. Preferably, a downwardly extending, annular, flexible seal 58 (FIG. 2) projects downwardly below the deck 57 and is received against the upper edge of the container adjacent the container opening or mouth so as to provide a leak-tight seal between the closure base deck 57 and the container. Of course, other types of closure/container seals (e.g., flat) may be employed. Also, if air-tightness is not required, no closure/container seal need be employed.

Figure 2:
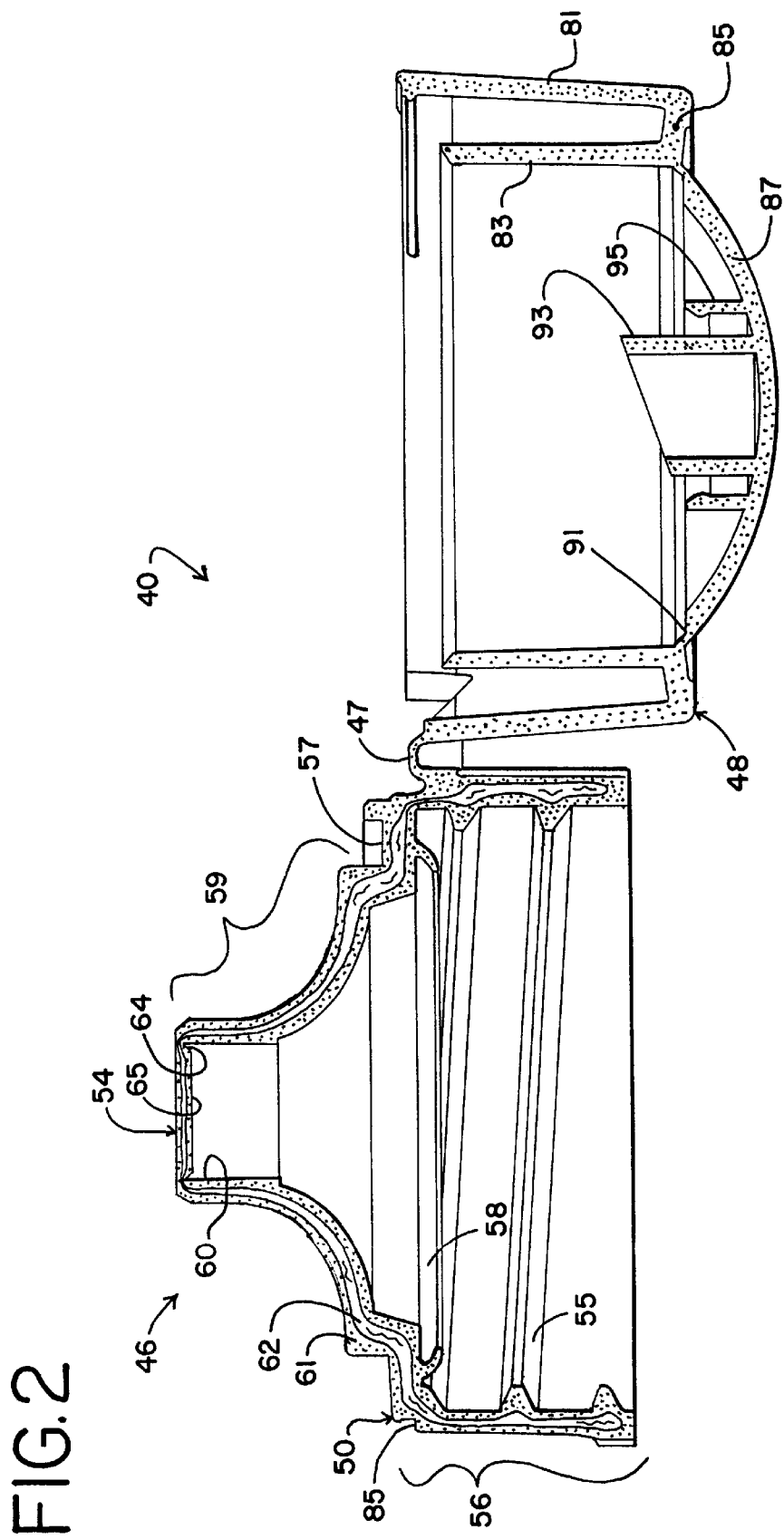
FIG. 2 is a cross-sectional view of the closure taken generally along the plane 2—2 in FIG. 1.

As illustrated in FIG. 2, the closure body discharge spout 59 projects upwardly to define a discharge aperture or dispensing orifice 60 which is initially occluded or sealed closed by the seal 54.

The closure body 46 may be characterized as having an exterior and an interior. The exterior is that portion of the closure body 46 which is exposed when the closure 40 is mounted on a container. The interior of the closure body 46 is that portion of the body 46 which would be inside the closure body 46 and not readily visible when the closure body 46 is viewed from the outside while mounted on a container.

As shown in FIG. 2, the closure body 46 includes a first material or skin material 61 defining the exterior and interior, and a second material or core material 62 which is encapsulated by the first material 61. For ease of illustration in FIGS. 2A and 2B, the second material 62 is shown by a dashed line representing a relatively thin portion of the second material 62 compared to the thickness of the surrounding first material 61.

The first material 61 and second material 62 extend across the dispensing orifice 60 to define the tamper-evident seal 54 (FIG. 2). In the preferred embodiment illustrated, the closure body 46 includes an annular groove 64 which is molded in the first material 61 at the periphery of the seal 54 to define a reduced thickness, frangible portion of material around the seal 54. The groove 64 is defined in an inwardly or downwardly facing surface 65 on the bottom of the seal 54. The groove 64 may have a completely closed path configuration, such as the circular configuration illustrated, or the groove 64 may extend around only a portion of the seal 54. In some applications, the groove 64 may be omitted altogether.

The use of the second material or core material 62 throughout the closure body 46 provides certain advantages.

For example, the second material 62 may be a material that has good barrier characteristics with respect to preventing the permeation or migration of various gases, such as oxygen, which could deleteriously affect a food product or pharmaceutical product over an extended period of time. The first material or skin material 61 need not have very good barrier characteristics, but could typically have much better characteristics with respect to strength, surface finish, aesthetic appearance, scratch resistance, etc. Any suitable material may be used for the first material 61, including, but not limited to, polypropylene or polyethylene. The second material 62 may be any suitable barrier material, such as, but not limited to, polyethylene naphthalate, ethylene vinyl alcohol, or Barex-210. Barrier materials, especially materials providing good barrier properties with respect to oxygen, are well-known.

In a presently contemplated preferred embodiment, a closure body 46 is molded from the first and second materials so that the thickness for the second material (i.e., core material) 62 in the seal 54 (FIG. 2) is between about 0.001 inch and about 0.005 inch. In the region over the annular groove 64, the outer layer of the skin material 61 (on the exterior of the core material 62) may have an exterior thickness ranging between about 0.015 inch and about 0.002 inch. On the interior of the second material 62, between the second material 62 and the top of the annular groove 64, the first material 61 may have a thickness ranging between about 0.002 inch and about 0.005 inch. In the portions of the body 46 outwardly of the seal 54 (e.g., in the walls of the spout 59, in the deck 57, and in the skirt 56, the core material or second material 62 may have a thickness up to about 0.05 inch.

The above-described material thicknesses are applicable to a presently contemplated preferred embodiment for a particular closure application. It will be appreciated that the first and second materials may have other thicknesses in other closure designs and/or for other applications. Further, it will be appreciated that the particular thicknesses of the first and second materials may depend, to some extent, upon the properties of the particular materials employed. For example, a material with very high barrier characteristics may be included in a closure body in only a very thin layer. A material with barrier properties that are not as great would require a thicker layer of such a material.

Figure 2A:
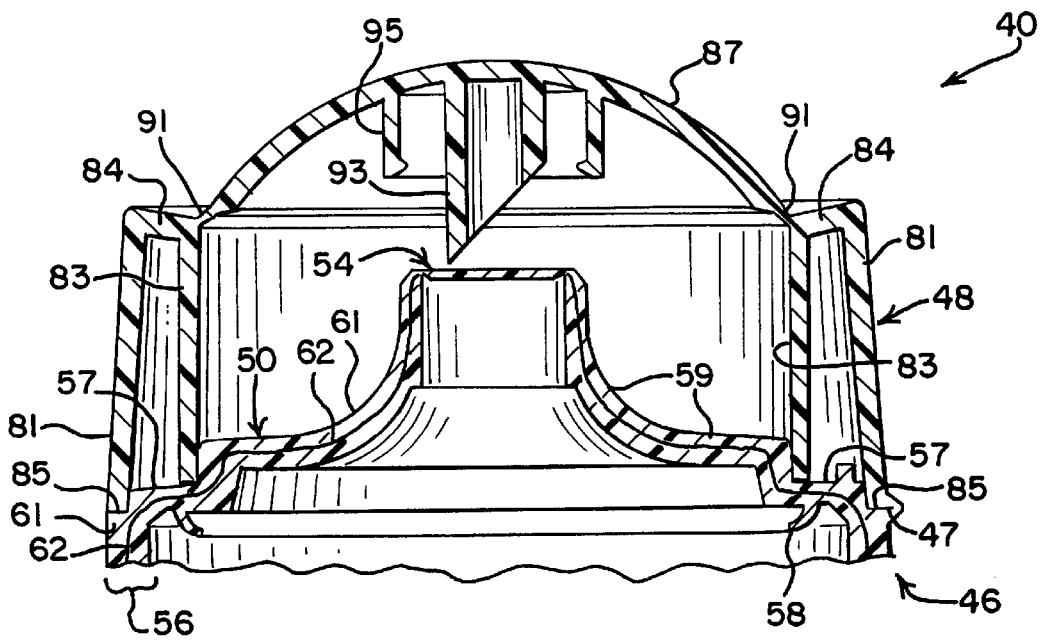
FIG. 2A is a fragmentary, cross-sectional view similar to FIG. 2, but FIG. 2A shows the lid closed in an unactuated condition.

The closure lid 48 is adapted to be initially mounted on the closure body 46 as illustrated in FIG. 2A. A hinge 47 (FIGS. 1 and 2) is provided as a unitary part of the closure 40 for connecting the lid 48 to the body 46. The hinge 47 may be a snap-action hinge. The illustrated snap-action hinge 47 is a conventional type described in U.S. Pat. No. 5,642,824. Other hinge structures may be employed, including a "floppy" living film hinge. However, it is preferable to employ a snap-action hinge so as to be able to readily maintain the hinge 47 in the open position during the dispensing of the container contents at the application site.

As shown in FIG. 2, the lid 48 includes a peripheral frame comprising an outer wall 81, an inner wall 83, and an annular connecting wall 84. As illustrated in FIG. 2A, the lid outer wall 81 is adapted to seat on an annular shoulder 85 defined at the top of the closure base body sidewall 56. The lid inner wall 83 is designed to be located on top of the closure body annular deck 57 around the base of the spout 59 as shown in FIG. 2A.

The lid 48 includes a flexible panel 87 which preferably defines a dome. The panel 87 is sufficiently flexible so that it can be moved downwardly when a force is applied to the top outer surface of the panel 87 as indicated by the arrow 89 in FIG. 2B.

Figure 2B:
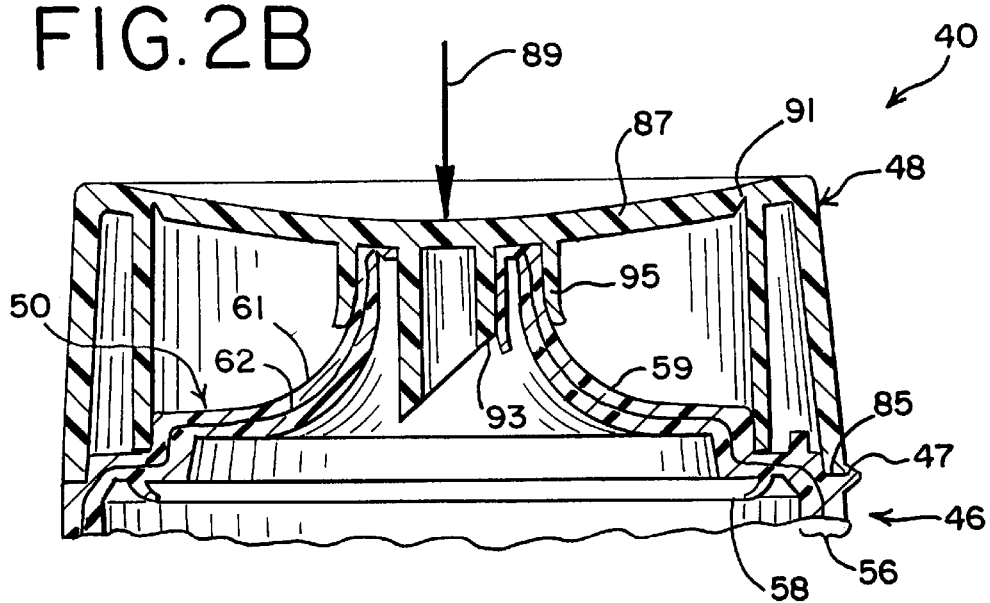
FIG. 2B is a view similar to FIG. 2A, but FIG. 2B shows the closure with the lid in a closed and actuated condition.

A presently preferred system for providing sufficient flexibility in the panel 87 includes connecting the panel 87 to the annular connecting wall 84 with a generally annular, reduced thickness film hinge 91 (FIG. 2A). This readily accommodates movement of the panel 87 from an outwardly convex configuration (as viewed from outside the lid) as shown in FIG. 2A to an inverted, inwardly concave configuration (as viewed from outside the lid), as shown in FIG. 2B.

The lid 48 includes a penetrator member 93 extending inwardly from the panel 87. Preferably, the penetrator member 93 is a tubular spike having a pointed end for piercing the membrane or seal 54.

An annular sealing collar 95 extends from the panel 87. The collar 95 is spaced radially from the penetrator member 93 for sealingly engaging the spout 59 when the panel 87 is in the inwardly concave configuration (FIG. 2B).

The closure 40, in the unactuated, closed, configuration shown in FIG. 2A is initially mounted on the container prior to delivery of the package to the user. The outwardly convex configuration of the lid panel 87 indicates that the seal 54 has not been punctured. A user may confirm this by opening the lid 48 to observe that the seal 54 is intact.

When the user desires to open the closure 40 to dispense product from the container, the user pushes down on the top surface of the panel 87 so that the penetrator member 93 pierces the central portion of the seal 54 (FIG. 2B). This action may be characterized as "opening" the seal 54 while at the same time "sealing" the spout 59 (by virtue of the engagement of the collar 95 with the exterior surface of the spout 59).

The panel 87 remains in the inverted, inwardly concave position to form a dished top (FIG. 2B). The container with the closure mounted thereon may then be turned upside down so that the container and closure can be supported upside down on a support surface. This will enable the product within the container to flow down to the region of the spout 59 under the influence of gravity so that the product can be readily discharged from the container when the lid 48 is later opened prior to use.

The panel 87 has two stable positions, the outwardly convex position illustrated in FIG. 2A and the inwardly concave position illustrated in FIG. 2B. At any position between the two stable positions, the panel 87 is in compression and exhibits a resistance to movement between the two stable positions. As the panel 87 is pushed from one stable position to the other stable position, the resistance to movement is overcome by resilient compressive bowing and distortion which is accommodated by the resilient material of the lid 48 (which may be polypropylene, for example) and by the annular film hinge 91.

When the user desires to dispense product from the container through the closure 40, the user lifts the lid 48 away from the spout 59. As the lid 48 moves upwardly, the friction created between the lid collar 95 and spout 59 exerts a downwardly or inwardly directed force on the collar 95 and panel 87. This force insures that the panel 87 remains in the inwardly concave configuration as the lid 48 is lifted upwardly.

When the lid 48 is moved far enough away from the spout 59, the product may be discharged from the container through the spout 59 by squeezing the container. When it is again desired to close the container, the lid 48 is pushed back onto the body 46 by pushing downwardly on the panel 87.

The force exerted downwardly on the panel 87 (in the direction of the arrow 89 as illustrated in FIG. 2B) prevents the panel 87 from inverting to an outwardly convex configuration and is effective in sealing the components in the closed configuration illustrated in FIG. 2B. The inwardly concave configuration of the lid indicates that the seal has been punctured.

As shown in FIG. 2, the closure body 46 includes the second material or core material 62 encapsulated by the first material or skin material 61—but the hinge 47 and lid 48 are formed from only the first (skin) material 61. The second material or core material 62 is typically a material such as ethylene vinyl alcohol or polyethylene naphthalate. This provides a permeation barrier to oxygen ingress (to prevent spoilage of a food product or degradation of an oxygen-sensitive chemical stored in the container on which the closure is mounted). This also provides a permeation barrier to carbon dioxide egress (as from a carbonated beverage in the container on which the closure is mounted). The skin material 61 (e.g., polypropylene) is typically less expensive and does not have good barrier properties relative to oxygen and carbon dioxide permeation.

The core material 62, while being relatively expensive, can provide its barrier function through the un-punctured closure body 46 in a very thin core structure. The core material 62 and the skin material 61 need not "adhere" to each other as with a melted/resolidified interface bond because the core material 62 is physically encapsulated by the skin material 61.

It is desired to form the lid without any core material so as to reduce the expense of the closure. It is also desired to form the hinge without any core material because conventional gas barrier core materials are relatively brittle and rigid. In very thin cross sections which would be required through a flexible hinge area, the thin hinge would be likely to break during use if the thin hinge included the rigid core material.

As described in detail hereinafter, the core and skin materials are first co-injection molded to form the closure body 46, but not the closure lid 48 and hinge 47, and the lid 48 and hinge 47 are subsequently formed by bi-injection molding 100% skin material to the closure body 46. During the bi-injection molding phase of the hinge 47 and lid 48, the skin material 61 in the hinge region forms an interface bond (e.g., a molecular attachment or intermingling of the materials at the interface) with the previously molded closure body skin material 61 adjacent the hinge 47.

Figure 3:
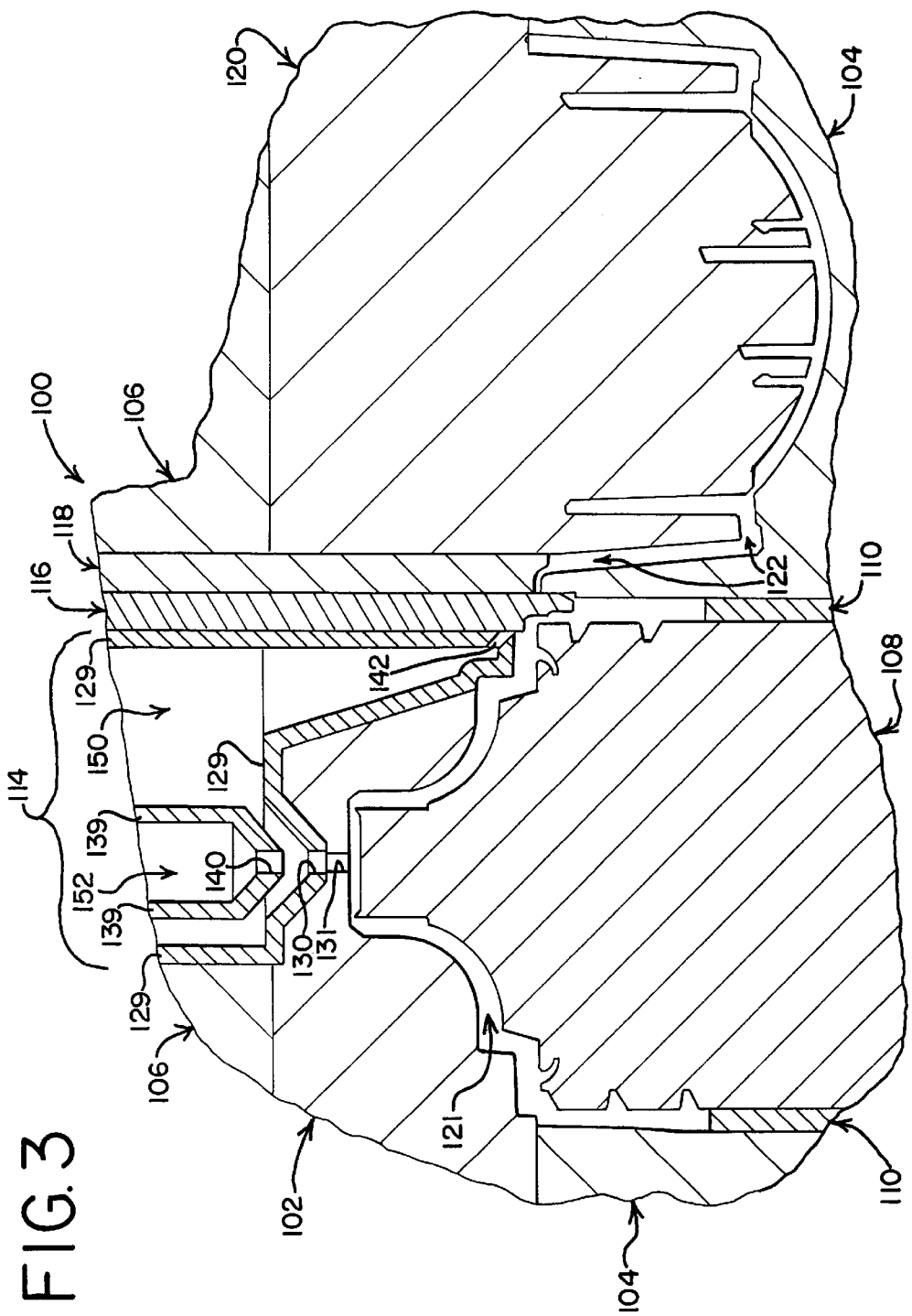
FIG. 3 is an enlarged, fragmentary, cross-sectional view of a mold in a closed condition defining the empty cavity regions for the closure body, hinge, and lid.

The process of the present invention for molding the closure 40 employs a single mold 100 and cooperating nozzle system as shown in FIG. 3. FIG. 3 shows the mold 100 in a closed position defining the empty cavity for the closure body 46, hinge 47, and lid 48. The mold 100 includes two main halves, an upper half or "A"-half cavity block 102 and a lower half or "B"-half cavity block 104. Mounted to the top of the upper, A-half cavity block 102 is a retainer plate 106. The retainer plate 106 functions to retain the components of the mold assembly. Extending through the lower, B-half cavity block 104 is a rotatable core 108. The core 108 is surrounded by an ejection sleeve 110. Conventional additional components, not visible, may include guide pins, bushings, spacers, etc.

Projecting into the upper, A-half cavity block 102 is an injection nozzle assembly 114. On one side of the nozzle assembly 114 is a movable shut-off member 116. Adjacent the movable shut-off member 116 is a stationary insert member 118. Finally, adjacent the distal end of the insert member 118 is a lid core 120 which is disposed between the upper retainer plate 106 and the lower B-half cavity block 104.

The mold 100 defines a first region or cavity portion 121 between the upper, A-half cavity block 102, nozzle assembly 114, movable shut-off member 116, lower, B-half cavity block 104, sleeve 110, and rotatable core 108. The first region 121 of the mold cavity defines at least a portion of the closure body which is formed by injection molding within the first region 121.

With continued reference to FIG. 3, a second region or second cavity portion 122 is defined by the lid core 120, extended movable shut-off member 116, insert member 118, and lower, B-half cavity block 104. The second region 122 defines the injection-molded lid (lid 48 in FIG. 2). The second region 122 also defines a portion of the closure hinge 47 (FIG. 2).

When the movable shut-off member 116 is withdrawn from its fully extended position (FIG. 3) to its fully retracted position (FIG. 4), a third region or cavity portion 123 is created between the second region 122 and the first region 121 adjacent the distal end of the shut-off member 116. The third region 123 may be regarded as establishing communication between, or joining, the second region 122 with the first region 121 when the shut-off member 116 is retracted. The third region 123 defines a part of the closure hinge (47 in FIG. 2) and an adjacent part of the closure body base 56 (FIG. 2).

As shown in FIG. 3, the nozzle assembly 114 includes an outer nozzle or outer housing 129 defining an outer nozzle orifice 130 which communicates with a first gate 131. The first gate 131 is defined in the upper, A-half cavity block 102 and extends from the outer nozzle orifice 130 to the mold cavity first region 121.

As shown in FIG. 3, the nozzle assembly 114 includes an inner nozzle or inner housing 139 defining an injection inner nozzle orifice 140 spaced from, and communicating with, the outer nozzle orifice 130. The inner nozzle 139 is adapted to accommodate flow of the second material or core material 62.

The outer nozzle 129 is adapted to (1) accommodate flow of the first material or skin material 61 alone in one mode of operation, and (2) accommodate flow-through of the second material or core material 62 together with, and surrounded by, the first material or skin material 61 in another mode of operation. The inner nozzle 139 and outer nozzle 129 together may be characterized as defining a combined co-injection nozzle structure or system.

The outer housing or outer nozzle 129 of the nozzle assembly 114 includes a second gate 142 as shown in FIG. 3. In the preferred embodiment illustrated, the second gate 142 communicates through the outer nozzle housing 129 of the nozzle assembly 114 with the inner nozzle orifice 140 and outer nozzle orifice 130. The second gate 142, per se, and the adjacent portion of the outer housing 129 defining the second gate 142, may be characterized as a "secondary nozzle" relative to a "primary," co-injection nozzle system defined by the inner nozzle orifice 140 and outer nozzle orifice 130.

The second gate 142 is initially occluded or blocked by the movable shut-off member 116 when the shut-off member 116 is in the fully extended position (FIG. 3). However, when the shut-off member 116 is moved to the fully retracted position (FIG. 4), the second gate 142 is open to the cavity third region 123 which communicates with cavity first region 121 and cavity second region 122.

The shut-off member 116 may be moved between the extended position (FIG. 3) and the retracted position (FIG. 4) by suitable means, including hydraulic or pneumatic actuators, electric motors, etc. The detailed design and operation of the mechanism for moving the shut-off member 116 forms no part of the present invention. The shut-off member 116 may be characterized as a dual-function means for (1) selectively closing off and opening communication through the mold cavity third region 123 between the mold cavity first region 121 and second region 122, and (2) selectively opening and closing the second gate 142.

Figure 3A:
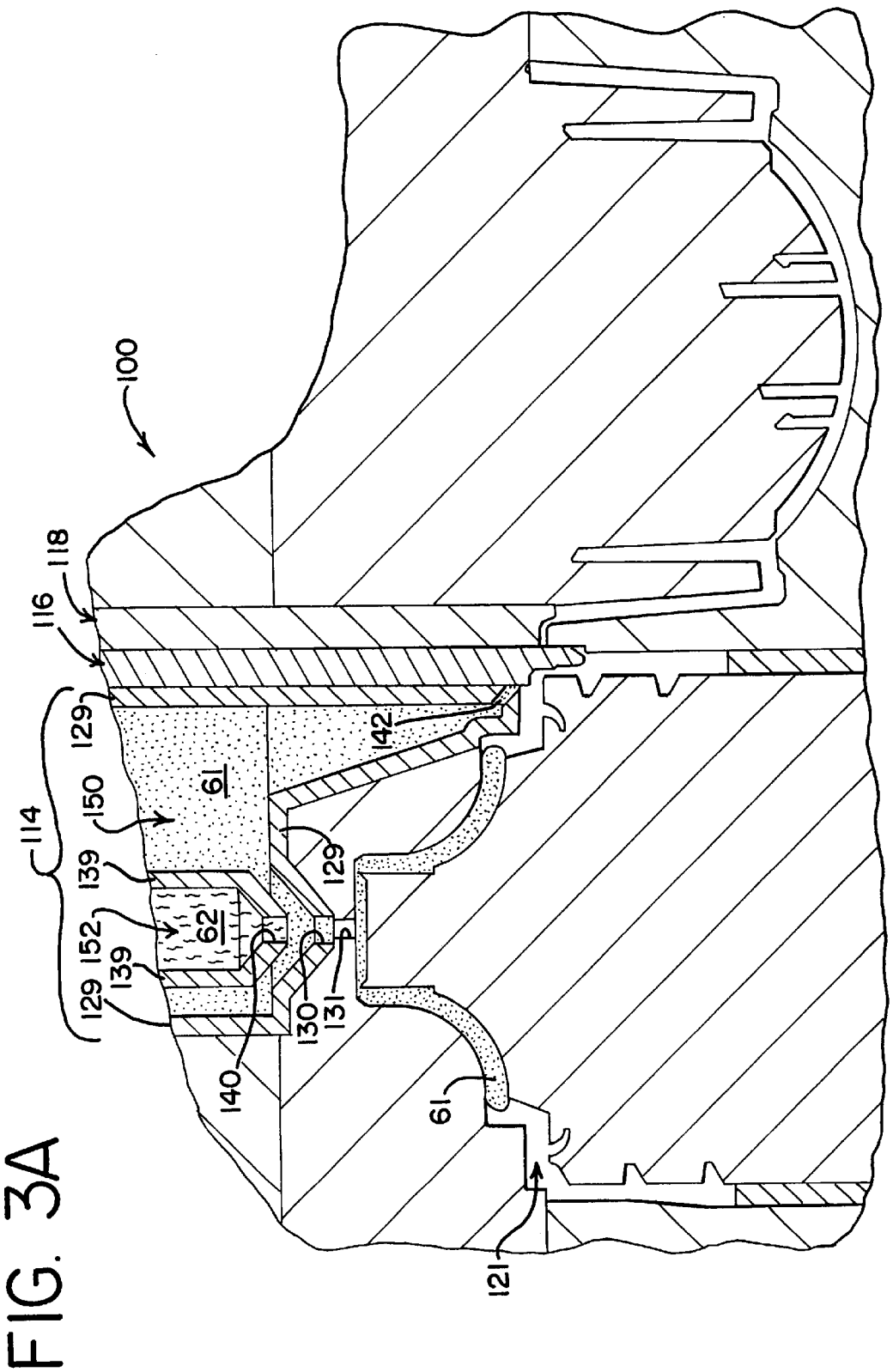
FIG. 3A is a view similar to FIG. 3, but FIG. 3A shows the initial stage of a first form of the process for molding the closure and, in particular.

As shown in FIG. 3, the outer nozzle or housing 129 defines an internal chamber 150 establishing communication between the second gate 142, nozzle orifice 130, and nozzle orifice 140. The chamber 150 serves to hold a supply of the first material or skin material 61 (FIG. 3A).

The inner nozzle or housing 139 and the inner nozzle orifice 140 define an internal chamber 152 which serves to hold a supply of the second material or core material 62.

The skin material 61 and core material 62 can be pressurized by a suitable injection molding pressurization system. Such a system may be of conventional or special design. Such a pressurization system is provided to pressurize the first and second materials in the nozzle assembly 114 together at the same pressures or at different pressures as controlled by a conventional closed loop pressure control system.

The pressurization system may be characterized as a means for injecting a first material, such as the skin material 61 (FIG. 2), from a supply of the first material through the outer nozzle orifice 130 and first gate 131 into the mold cavity first region 121.

The pressurization system may also be characterized as means for co-injecting a flowable second material, such as the core material 62 (FIG. 2) from the inner nozzle orifice 140 and then through the outer nozzle orifice 130 and first gate 131 along with the first material (skin material) 61 at certain times during the injection molding process as described in detail hereinafter.

The pressurization system may also be characterized as means for injecting the first material or skin material 61 through the second gate 142 when the second gate 142 is opened by retraction of the shut-off member 116.

Conventional co-injection nozzle and pressurization systems are provided in the U.S.A. by Van Dorn Demag, having an office at 11792 Alameda Drive, Strongsville, Ohio 44136. The detailed design and operation of systems for pressurizing a first material, such as the skin material 61, and a second material, such as the core material 62, form no part of the present invention. Such systems can be modified in accordance with the teachings of the present invention to include the second gate 142 and to operate as described in detail hereinafter.

The components which define the mold cavity regions 121, 122, and 123 may be moved from the "closed" condition illustrated in FIG. 3 to an open position (not illustrated) for exposing and releasing the molded closure 40. The mechanism or mechanisms for moving the components to effect opening of the mold 100 and release of the molded closure may be of any conventional or special design, the details of which form no part of the present invention.

FIG. 3A shows the beginning of the first form of the process at the beginning of the co-injection fill phase for the closure body cavity. Initially, the core material 62 (e.g., ethylene vinyl alcohol) in the inner chamber 152 defined by the inner nozzle or housing 139 is maintained at a "hold pressure," and is not discharged from the inner nozzle orifice 140. The outer skin material 61 (e.g., polypropylene) is maintained in the outer chamber 150 of the outer nozzle or housing 129 at a greater injection pressure and begins to flow through the outer nozzle orifice 130 into the upper part of the closure body cavity first region 121 until the closure body cavity first region 121 is about one third full (the extent of the initial fill of the closure body cavity first region 121 depends upon the skin material viscosity and temperature, as well as upon the thickness of the structure to be molded, etc.).

Figure 3B:
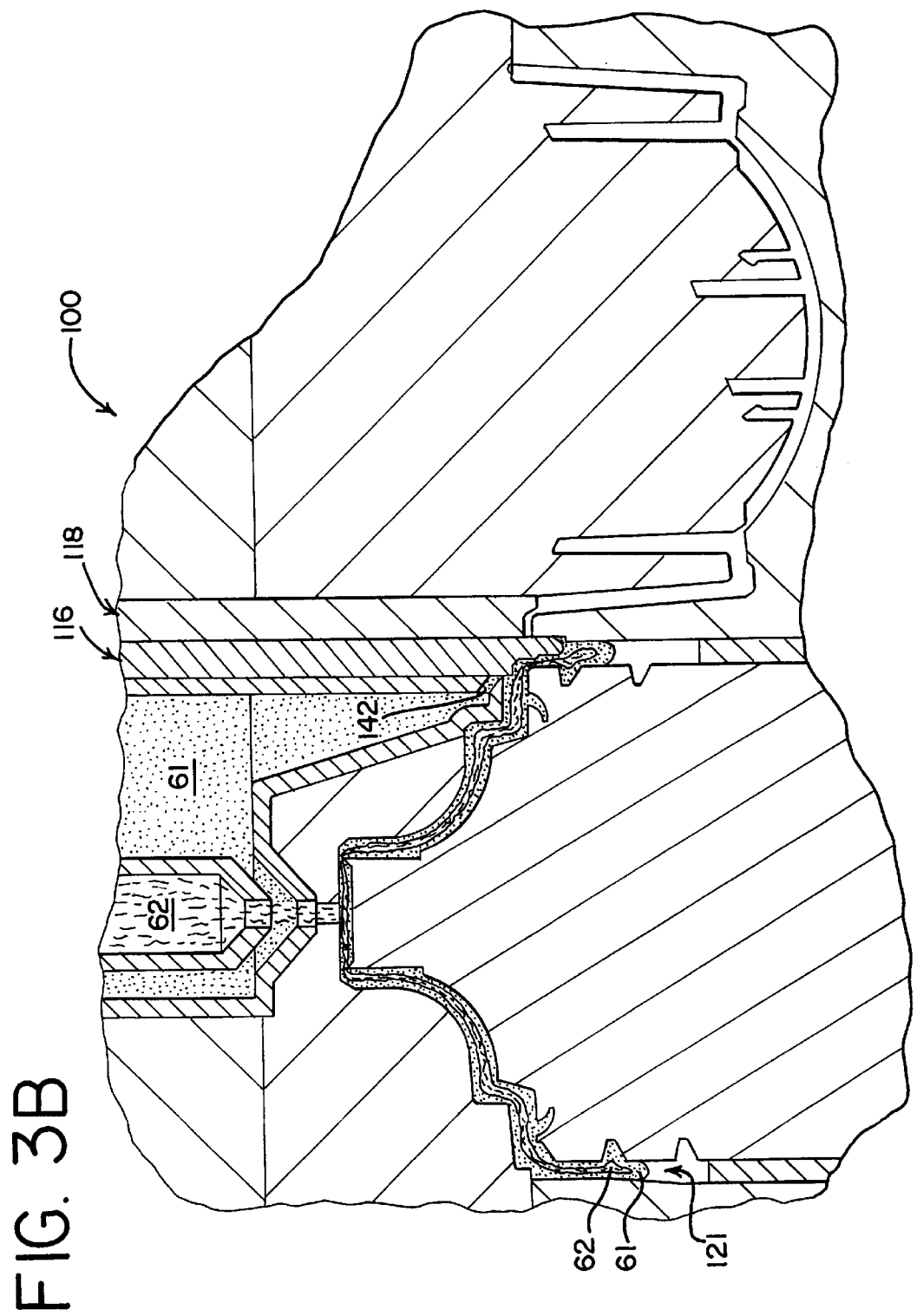
FIG. 3B is similar to FIG. 3A, but FIG. 3B shows a later stage in the molding process wherein the inner nozzle core material pressure is increased to a core material injection pressure, and the core material begins to flow through the skin material and then along with the skin material into the closure body cavity region.

FIG. 3B shows a later stage in the process wherein the pressure of the core material 62 is increased to a core material injection pressure, and the core material 62 begins to flow through the skin material 61 and then along with the skin material 61 into the cavity first region 121. The core material 62 initially flows faster through the skin material 61 that is already in the closure mold cavity first region 121, but does not flow beyond the flow front of the skin material 61. Also, the core material 62 remains encapsulated within the surrounding skin material 61. As shown in FIG. 3B, the skin material 61 and core material 62 flow through a narrow region adjacent the bottom end of the extended shut-off member 116 next to the hinge region of the closure. The shut-off member 116 remains in the fully extended position still occluding the second gate 142.

Figure 3C:
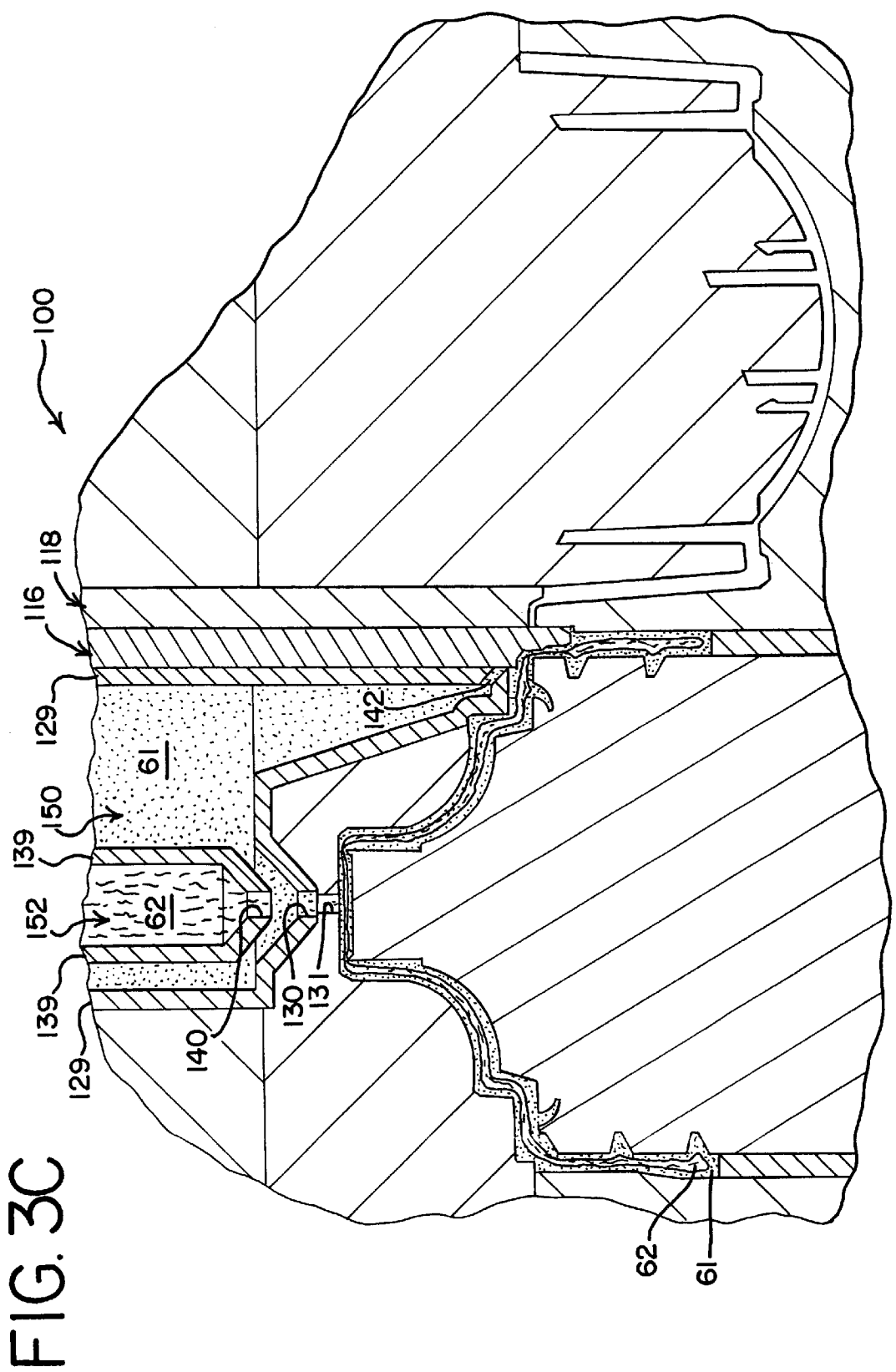
FIG. 3C is a view similar to FIG. 3B, but FIG. 3C illustrates a further stage in the molding process wherein the core material pressure is reduced to a holding pressure in the inner nozzle while the skin material remains at the injection pressure in the outer nozzle.

FIG. 3C illustrates a further stage in the process wherein the pressure of the core material 62 is reduced to a holding pressure in the inner nozzle 139 and chamber 152 while the skin material 61 remains at a greater injection pressure in the outer nozzle 129 and chamber 150. The core material 62 thus stops flowing before it gets to the end of the skin material flow front at the bottom of the closure. The skin material 61 continues to fill the cavity first region 121 at the bottom of the closure and, preferably, also fills the top of the cavity adjacent the first gate 131 to cover the core material gate vestige so that an aesthetically pleasing condition is achieved wherein no core material 62 will be visible on the exterior of the molded product.

The core material 62 is preferably completely surrounded by the skin material 61. However, the process may be operated so that the core material 62 may be exposed at the bottom edge of the closure body and/or at the top of the closure body adjacent the first gate 131. Although such a condition may not be as aesthetically pleasing as complete encapsulation of the core material 62, the core material 62 is substantially surrounded by the skin material 61, and the core material 62 still can function as intended to provide a permeation barrier to gas egress out of, or gas ingress into, the mouth of the container.

At the end of the step illustrated in FIG. 3C, a holding/cooling period from 0 to 2 seconds occurs to allow some solidification of the co-injected materials 61 and 62. This terminates the "co-injection phase."

Figure 4:
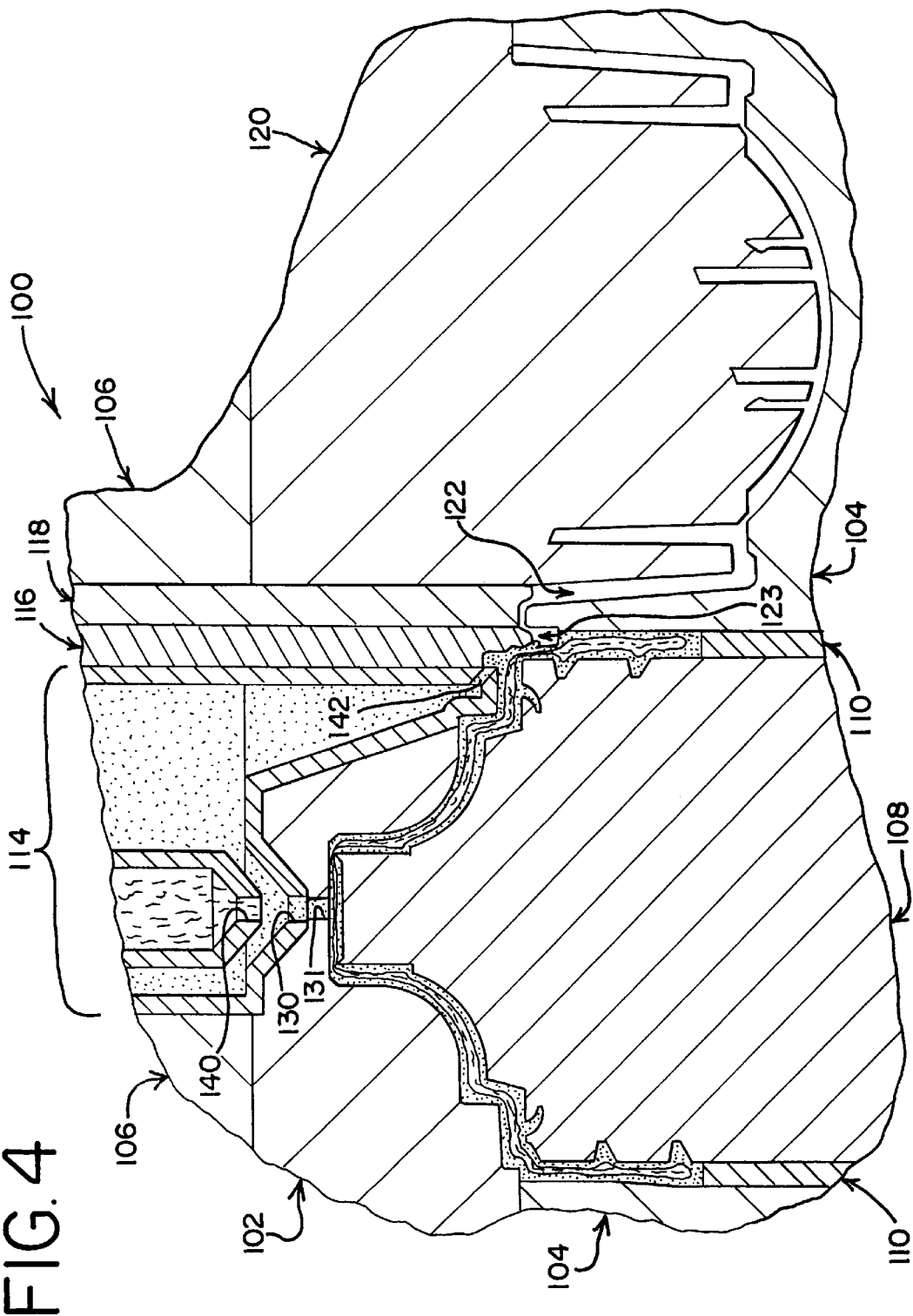
FIG. 4 is a view similar to FIG. 3C, but FIG. 4 illustrates the beginning of the bi-injection phase of the process which is initiated by withdrawing the shut-off member to a retracted position.

FIG. 4 illustrates the beginning of the "bi-injection phase." The bi-injection phase is initiated by withdrawing the shut-off member 116 to the retracted position (FIG. 4), thus opening the second gate 142. The retraction of the shut-off member 116 also establishes communication between the cavity first region and second region through the intermediate third region 123. In the retracted position, the distal end of the shut-off member 116 corresponds to a portion of the as-molded exterior shape of the closure.

In the bi-injection phase beginning with the retraction of the shut-off member 116, the skin material 61, which has remained at injection pressure while the core material 62 has remained at the lower hold pressure, begins to flow through the opened second gate 142 adjacent the third region or hinge region 123 of the cavity. The skin material 61 flows through the hinge region 123 and then also fills the cavity second region 122 defining the closure lid 48 (FIG. 2). The skin material 61 in the third region 123 bonds to the previously co-injected, and partially solidified, skin material 61 in the second region 121 adjacent the third region (hinge region) 123.

Figure 5:
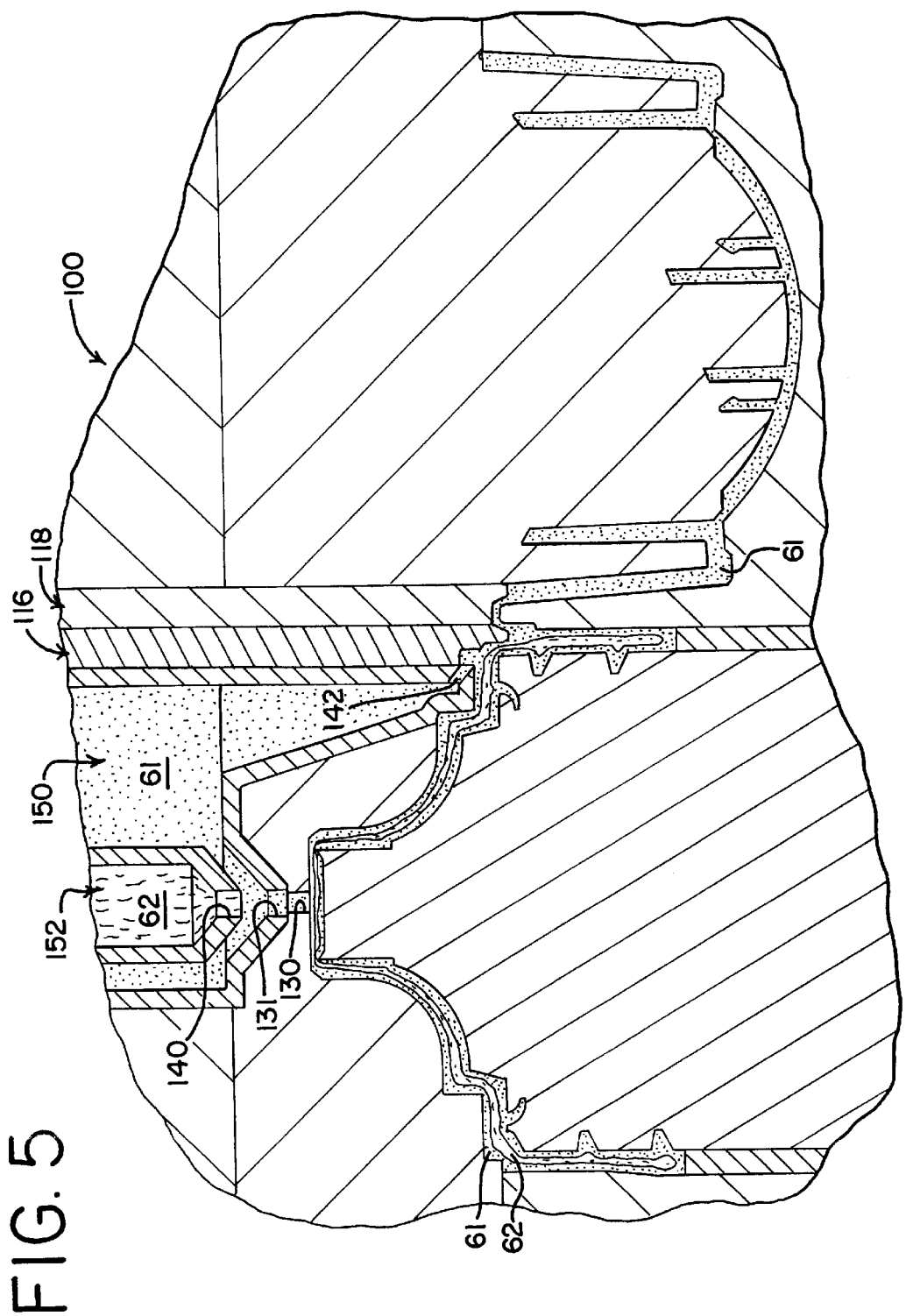
FIG. 5 is a view similar to FIG. 4, but 5 illustrates the final stage in the molding process wherein the inner nozzle core material pressure and the outer nozzle skin material pressure are reduced after the skin material has flowed into the lid cavity region.

Subsequently, as shown in FIG. 5, the pressure in the nozzle assembly 114 is reduced—typically to around 0 psig. The mold 100 can now be opened and the completed closure ejected.

FIGS. 6–10 illustrate an alternate embodiment of the process which employs a shut-off pin instead of differential pressures in the nozzle assembly. In particular, in the alternate embodiment of the process illustrated in FIGS. 6–10, the mold is designated generally by the reference numeral 100A, and the components of the mold 100A are identical with the components in the first embodiment of the mold 100 described above with reference to FIGS. 3–5 except that the mold 100A includes a shut-off pin 200A which is adapted to move between open and closed positions with respect to the nozzle assembly.

The components of the second embodiment of the mold 100A are designated with the same reference numbers used for the first embodiment of the mold 100 described above with reference to FIGS. 3–5 except that the reference numbers for the components of the mold 100A have the suffix "A." The components of the second embodiment of the mold 100A which are designated with the suffix "A" are identical with, and function in an identical manner with, the corresponding components in the first embodiment of the mold 100 described above with reference to FIGS. 3–5.

In particular, the mold 100A includes mold parts which define a mold cavity first region 121A for a portion of the closure body, a second region 122 of the mold cavity for the closure lid and a portion of the hinge, and a third region 123A (FIG. 9) of the mold cavity defining a portion of the closure hinge and closure body.

Figure 6:
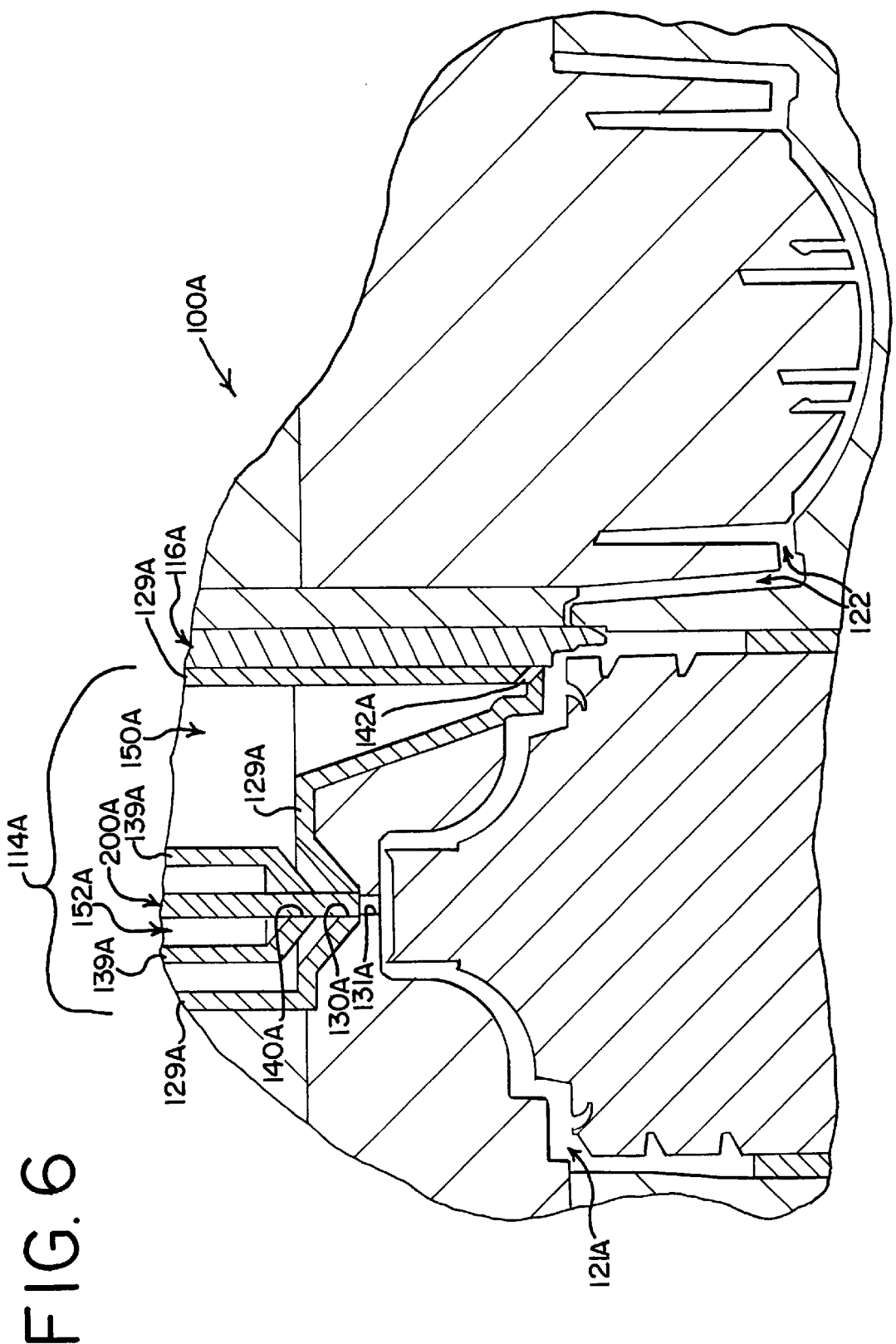
FIG. 6 is a view similar to FIG. 3 showing a mold in the closed condition, but FIG. 6 illustrates an alternate embodiment of the molding apparatus for effecting an alternate embodiment of the molding process by incorporating a shut-off pin instead of using different pressures in the co-injection phase as employed in the first embodiment of the process illustrated in FIGS. 3–5.

Further, the mold includes a movable shut-off member 116A, and also includes a first gate 131A which communicates with the outer housing of a nozzle assembly 114A. The nozzle assembly 114A comprises an outer nozzle or outer housing 129A, outer nozzle orifice 130A, outer chamber 150A, inner nozzle or inner housing 139A, inner nozzle orifice 140A, and inner chamber 152A. The outer housing 129A defines a second gate 142A in communication with the outer chamber 150A, and the second gate 142A is normally blocked or occluded by the distal end of the movable shut-off member 116A when the shut-off member 116A is in the fully extended position (FIG. 6).

Figure 7:
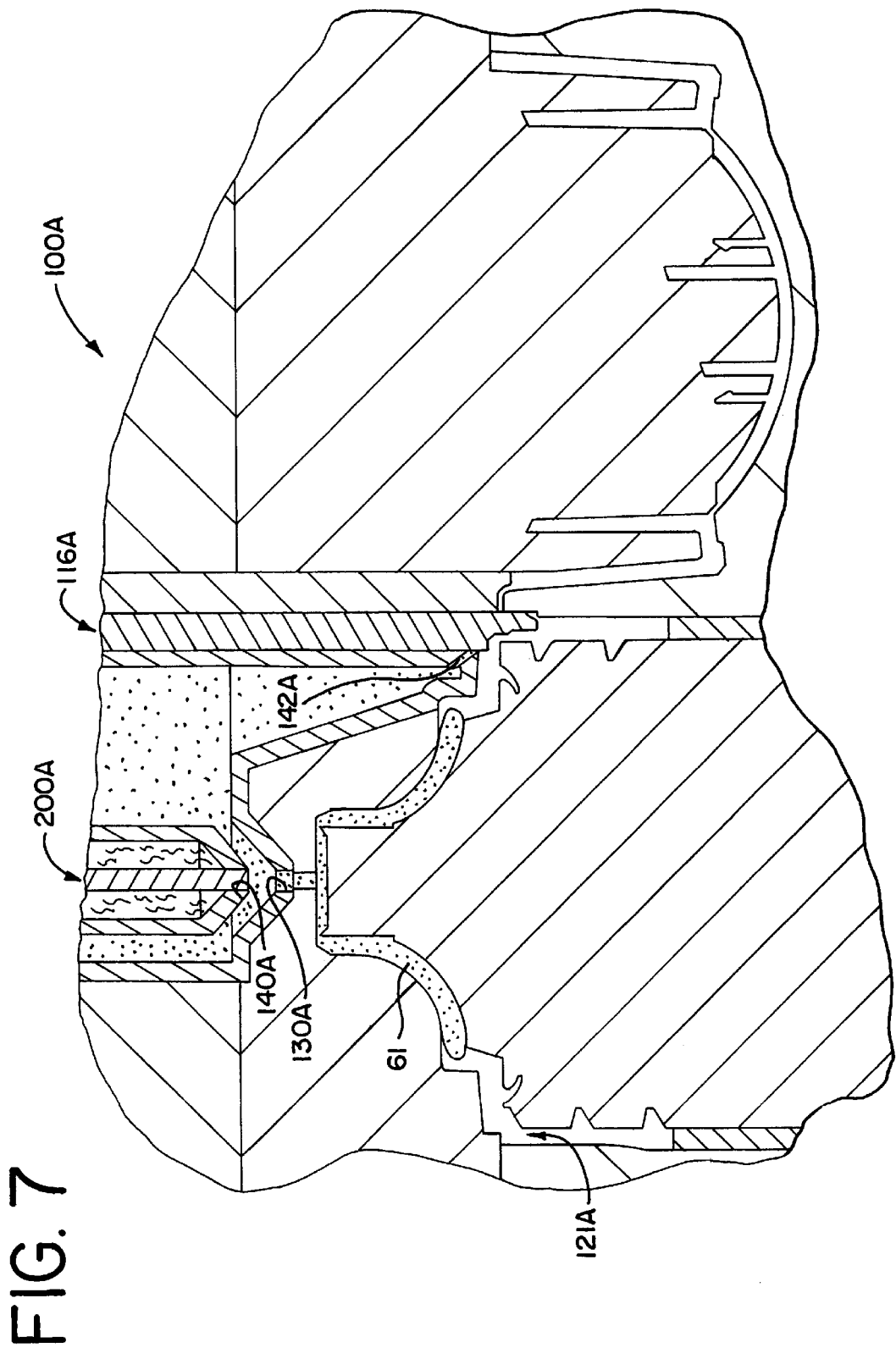
FIG. 7 is a view similar to FIG. 6, but FIG. 7 shows the start of the second embodiment of the molding process with the shut-off pin retracted partway to open the skin material outer nozzle while still maintaining the core material inner nozzle closed.
Figure 8:
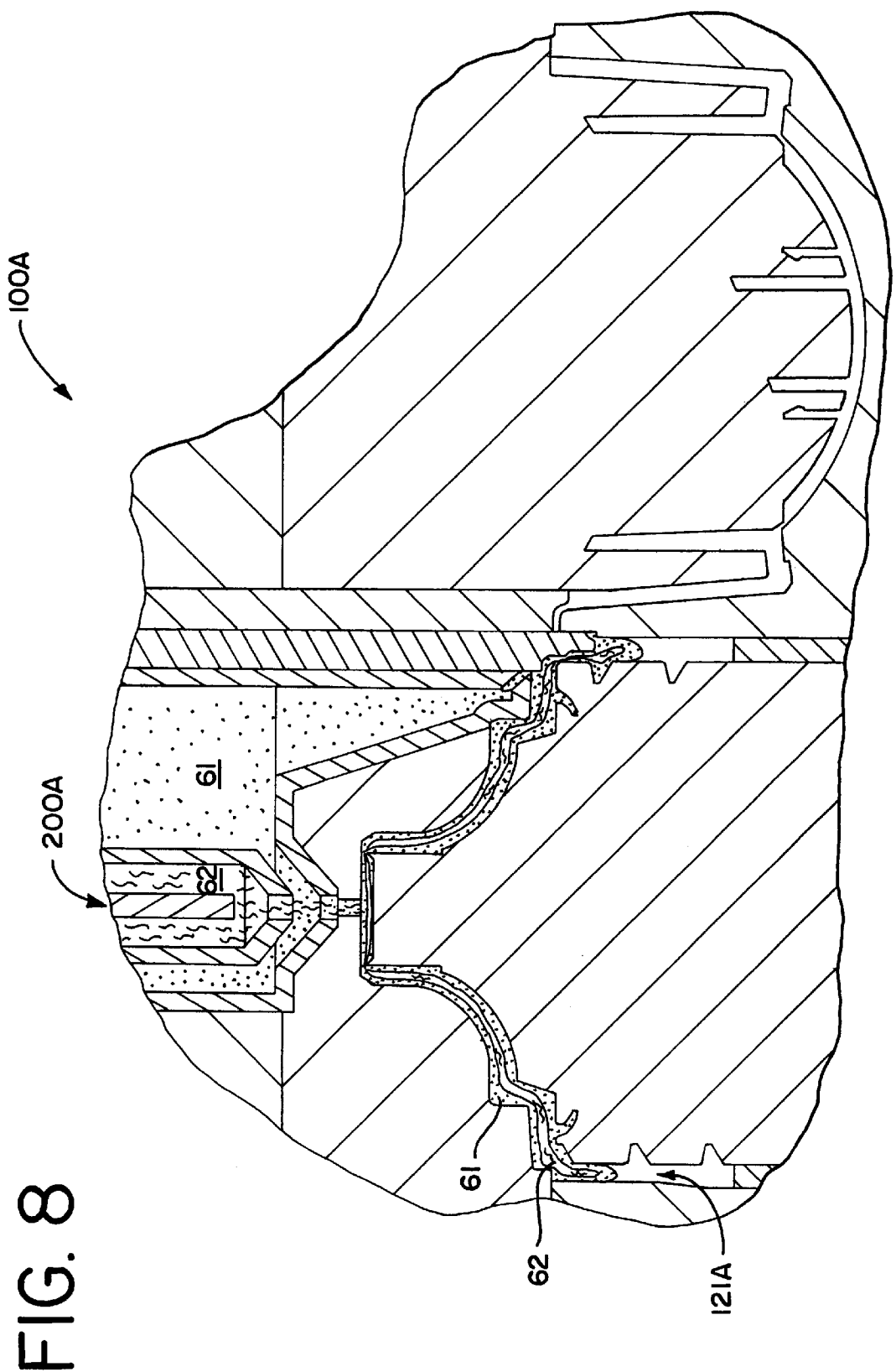
FIG. 8 is a view similar to FIG. 7, but FIG. 8 shows a further stage in the process where the shut-off pin is fully retracted to open the core material inner nozzle as well as the skin material outer nozzle.

The shut-off pin 200A may be of any suitable special or conventional design. The shut-off pin 200A is moved, by suitable conventional (or special) mechanisms, among three positions: (1) a fully extended position as shown in FIG. 6, (2) a partially retracted position as shown in FIG. 7, and (3) a fully retracted position as shown in FIG. 8. The detailed design and operation of the mechanisms for effecting the retraction and extension of the shut-off pin 200A form no part of the present invention. A suitable co-injection nozzle and shut-off pin system is sold in the U.S.A. by Bemis Manufacturing Company, 300 Mill Street, P. O. Box 901, Sheboygan Falls, Wis. 53085, U.S.A. The system can be modified in accordance with the teachings of the present invention to include the gate 142A and to operate as described in detail hereinafter.

As explained in detail hereinafter, the shut-off pin 200A, in conjunction with the pressurization system, functions as means for (1) injecting the skin material alone into the mold cavity first region during one mode of operation, and (2) injecting the skin material and core material together into the mold cavity first region in another mode of operation. Also, the shut-off pin 200A, together with the shut-off member 116A and pressurization system, functions as means for injecting the skin material into the mold cavity second and third regions.

At the beginning of the co-injection phase (FIG. 6), the shut-off pin 200A is in a fully extended position closing the discharge orifice of the core material inner nozzle 140A and discharge orifice of the skin material outer nozzle 130A. The molding process starts as shown in FIG. 7 with the shut-off pin 200A retracted partway so as to open the skin material outer nozzle 130A but still close the core material inner nozzle 140A. Thus, initially just the skin material 61 begins to flow into the mold cavity first region 121A. The skin material 61 cannot flow through the second gate 142A which is occluded by the shut-off member 116A which is initially maintained at the extended position.

FIG. 8 illustrates the next stage of the molding sequence as the shut-off pin 200A is fully retracted to open the core material inner nozzle orifice 140A as well as the skin material outer nozzle orifice 130A. The core material 62 thus flows through the skin material 61 to near the end of the flow front of the skin material 61, and the skin material 61 and core material 62 continue to flow together to fill the entire mold cavity first region 121A for the closure body. The skin material 61 at the flow front completely fills the end of the mold cavity first region 121A for the closure body.

Figure 9:
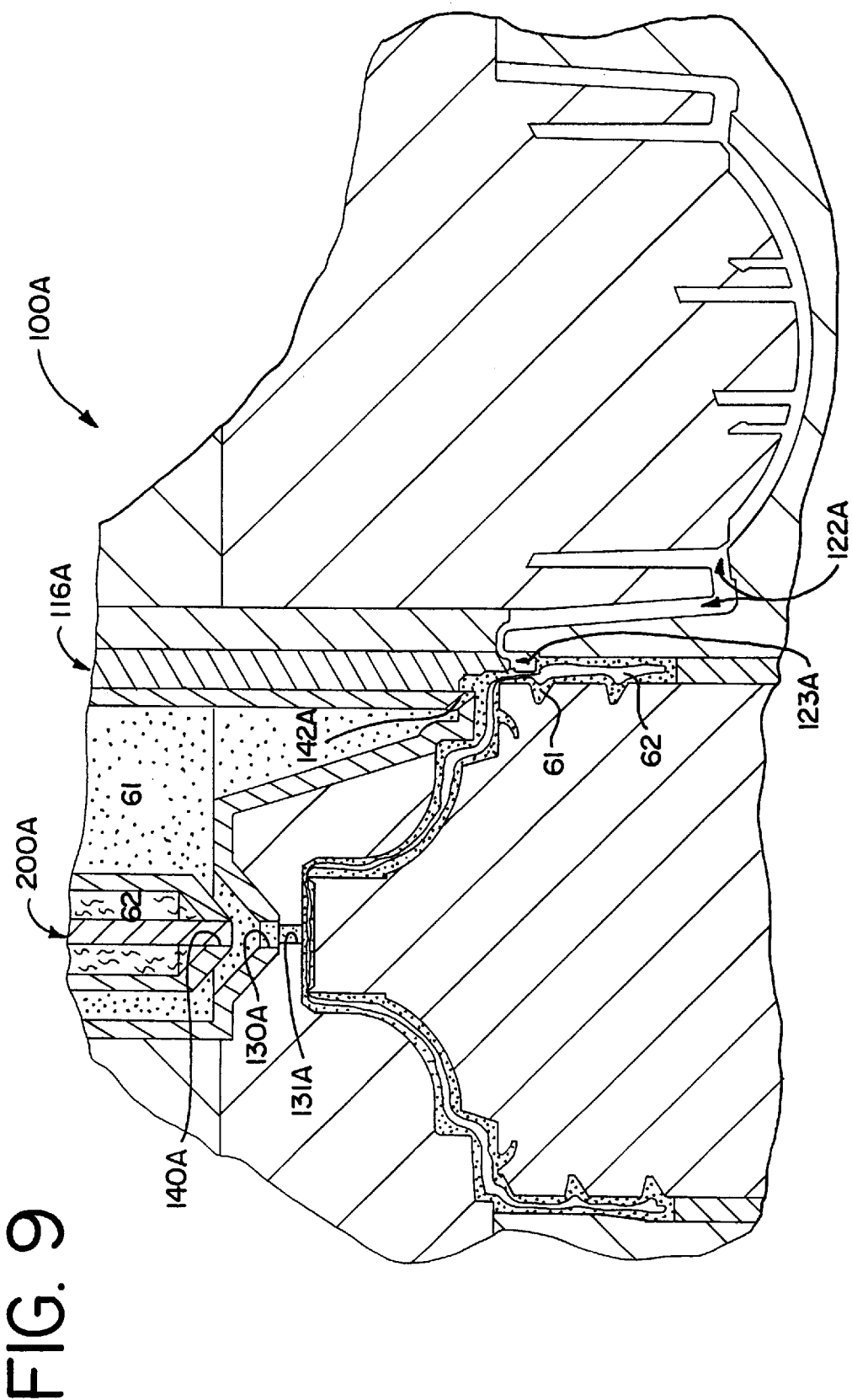
FIG. 9 is a view similar to FIG. 8, but FIG. 9 shows the process in a further stage wherein the shut-off pin has been extended partway to fully close the core material inner nozzle while maintaining the skin material outer nozzle open, and FIG. 9 also shows a shut-off member retracted to (1) expose an intermediate mold cavity region adjacent the hinge, and (2) open the second gate so that skin material can flow through the second gate into the closure lid cavity region.

As shown in FIG. 9, the shut-off pin 200A is next extended partway to fully close the core material inner nozzle orifice 140A but maintain the skin material outer nozzle orifice 130A open. The skin material 61 thus continues to flow under pressure so as to preferably cover over the core material 62 at the first gate 131A. If desired, the pin 200A could next be fully extended to close the outer nozzle orifice 130A as well as the inner nozzle orifice 140A for a cooling period (e.g., 0 to 2 seconds) to allow some cooling and solidification of the co-injected materials forming the closure body. Alternatively, the pin 200A could remain retracted from the outer nozzle orifice 130A after the mold cavity first region is filled. With either alternative, the next step, as shown in FIG. 9, is to retract the shut-off member 116A to open the second gate 142A and expose the intermediate (third) region 123A between the first region 121A and second region 122A. This establishes communication with the hinge and lid portions of the mold cavity. The skin material 61 can flow through the second gate 142A, and this begins the bi-injection phase. As the skin material 61 flows through the second gate 142A, the skin material 61 flows past the previously co-injected skin material adjacent the hinge region and bonds to the previously injected co-injected skin material adjacent the hinge region. The skin material 61 flowing in the bi-injection phase continues through the mold cavity second region 122A (i.e., the hinge cavity portion and lid cavity portion) to fill the second region with 100% skin material.

Figure 10:
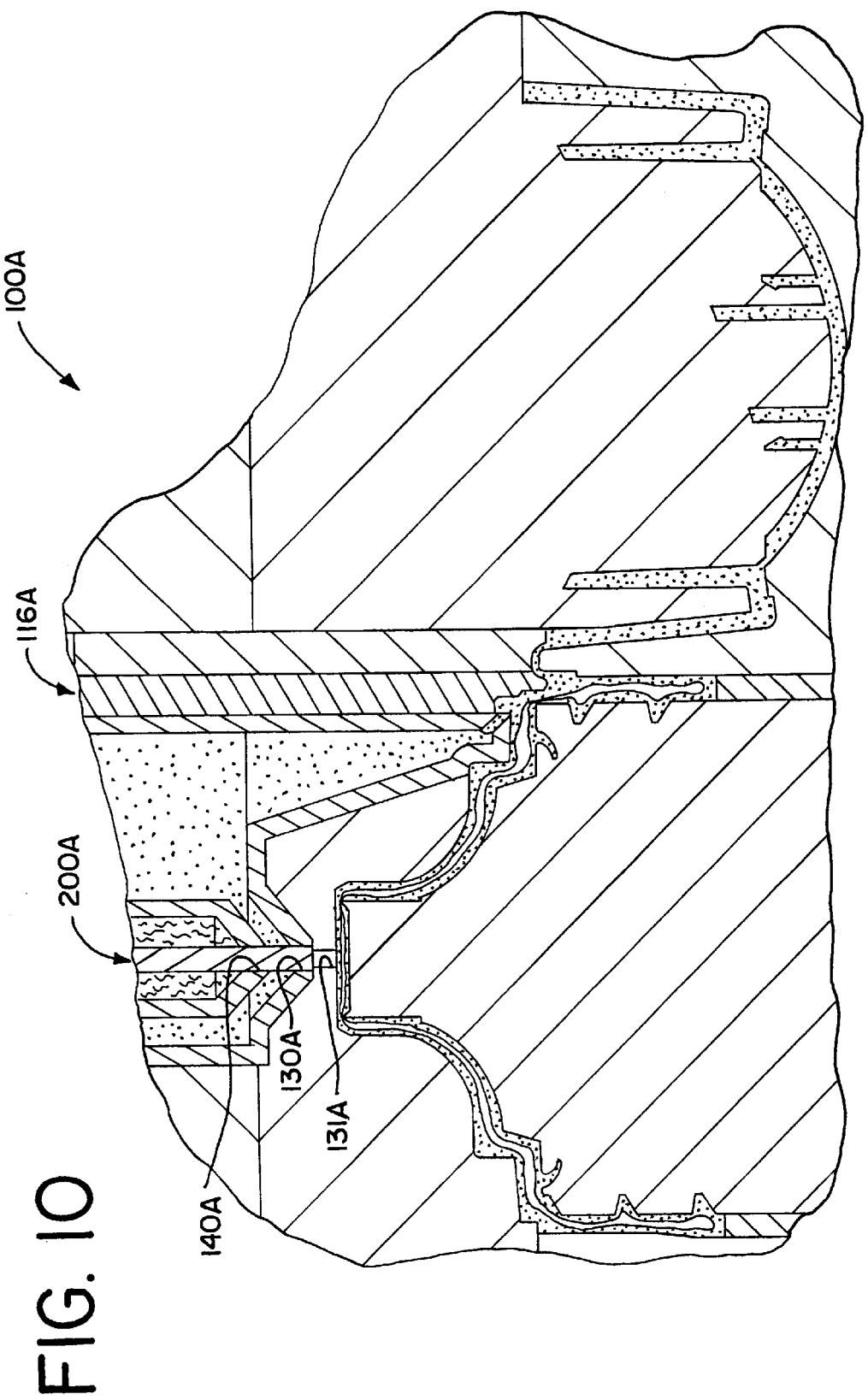
FIG. 10 is a view similar to FIG. 9, but FIG. 10 shows a final stage in the second embodiment of the process wherein the shut-off pin has been fully extended to completely shut off the skin material outer nozzle as well as the core material inner nozzle.

After the closure hinge and lid are fully filled with skin material, the shut-off pin 200A is fully extended to the complete shut-off position as shown in FIG. 10 wherein the skin material outer nozzle orifice 130A is occluded as well as the core material inner nozzle orifice 140A. Next, the skin material pressure is reduced in the outer nozzle orifice 130A so as to prevent continued flow through the second gate 142A. The mold is then opened, and the molded closure is ejected.

The process of the present invention incorporates both co-injection and bi-injection in a combined process effected in a single mold, and this process also preferably includes the novel incorporation of a second gate in communication with the skin material outer nozzle housing of a co-injection nozzle assembly so that the second gate injects only the skin material.

It will be appreciated that, in an alternate form, the second gate could be provided not in the skin material outer nozzle housing, but rather, in the core material inner nozzle housing so as to be able to effect bi-injection of the core material in a product where that would be desired.

Thus, one aspect of the present invention generally contemplates providing a second gate on either (1) the core material inner nozzle housing or (2) the skin material outer nozzle housing of a co-injection nozzle assembly so as to be able to use either (a) the core material in a bi-injection process or (b) the skin material in a bi-injection process to mold a portion of the product in a single mold in a second phase following a first co-injection phase of both the skin material and core material.

Another aspect of the present invention includes a process using the second gate on either the core material inner nozzle housing or on the skin material outer nozzle housing of a co-injection nozzle assembly so as to permit (1) the initial co-injection of both materials, and (2) a subsequent bi-injection of one of the materials in the same, single mold cycle without opening the mold during the cycle (i.e., a mold cycle consisting of closing the mold, injecting the materials, molding (and cooling) the materials in the closed mold, and opening the mold for ejection of the molded product). This is distinguished from conventional "over molding techniques" wherein the mold must be opened after a first material injection phase, and then the first material molded part must be moved to a second cavity so as to permit the second material to be subsequently molded over a portion of the first material.

Another aspect of the invention broadly relates to the providing of a movable shut-off member adjacent the hinge area of a closure having a body and lid joined by the hinge, wherein the body is initially co-injection molded from two materials, and subsequently the hinge and lid are bi-injection molded from only a second material. According to this aspect of the invention, the process employs a co-injection first phase using a co-injection nozzle assembly with integral first and second gates which cooperate so that the first phase is a two-material, co-injection phase and not merely a single material injection molding first phase, and so that the second phase is an injection of only a single material against the previously co-injected material portion of the product.

Another aspect of the invention relates to the location of the second gate adjacent the extended, closed position of a dual function shut-off member so that (1) the shut-off member functions to shut off or occlude the second gate, and (2) the shut-off member also simultaneously functions to close off access to another part of the cavity (e.g., the hinge and lid region of the cavity). In other words, the shut-off member has two, simultaneously occurring functions during co-injection of the first portion of the mold cavity: (1) temporarily shutting off of the second gate, and (2) temporarily occupying another portion of the mold cavity to prevent flow of molding material into that part of the cavity. Another related aspect of the invention is the use of the distal end of the shut-off member in the retracted position to define a part of the molded product exterior (e.g., the area of the attachment of the hinge to the body).

The present invention also contemplates specific alternative designs for some of the aspects. For example, the second gate (142 or 142A) could be provided in the form of a secondary nozzle separated from the co-injection nozzle assembly (114 or 114A) and separately supplied with pressurized molding material (e.g., core material 62 or 62A) via a manifold.

A manifold system could be provided to supply molding material to the nozzle, and such a manifold system could be mounted on the mold or could be integral with the mold or mold press.

It will be readily observed from the foregoing detailed description of the invention and from the illustrations thereof that numerous other variations and modifications may be effected without departing from the true spirit and scope of the novel concepts or principles of this invention.

What is claimed is:

1. A closure having a unitary construction of components which include a body, a lid, and a hinge connecting the body to the lid, said closure including (1) a skin material substantially surrounding a core material in said body, (2) only said skin material in said lid, and (3) only said skin material in said hinge so that said hinge skin material is bonded to said body skin material at an interface between said body and hinge, said closure made by the process comprising the steps of:

(A) providing a closed, single mold having a cavity that defines the configuration of the closure components with the lid open and that has a first region defining the configuration of at least a portion of said body, a second region defining the configuration of said lid and at least a portion of said hinge, and a third region joining said mold cavity first and second regions;

(B) injecting a flowable skin material from a supply of said flowable skin material through a first gate into said mold cavity first region while closing off communication through said mold cavity third region between said mold cavity first and second regions;

(C) during at least a portion of step (B), co-injecting a flowable core material through said first gate along with said skin material to fill said mold cavity first region with said core material substantially surrounded by said skin material so that substantially all surfaces of said core material are in contact with said skin material and so that said core and skin materials are substantially non-destructively inseparable;

(D) after step (C), terminating the flow of at least said core material;

(E) establishing communication between said mold cavity first and second regions through said mold cavity third region;

(F) opening a second gate communicating directly between said supply of said flowable skin material and one of said mold cavity second and third regions;

(G) injecting said skin material from said supply of flowable skin material through said second gate to fill said mold cavity second and third regions;

(H) terminating the injection of said skin material after said mold cavity second and third regions are filled with said skin material and allowing said skin material in a portion of said mold cavity third region to bond to said skin material in said mold cavity first region at an interface between said mold cavity first and third regions; and (I) opening said mold cavity to release the molded closure.

2. A closure having a unitary construction, said closure including (1) a first portion having a first material substantially surrounding a second material, (2) a second portion comprising only one of the first and second materials, and (3) a third portion that (a) joins said first and second portions, and (b) comprises only one of said first and second materials bonded to said first portion first material at an interface between said first and third portions, said closure made by the process comprising the steps of:

(A) providing a closed, single mold with a cavity having a first region defining the configuration of at least said first portion of said closure, a second region defining the configuration of said second portion of said closure, and a third region defining the configuration of said third portion and joining said first and second regions;

(B) injecting a first material from a supply of said first material through a first gate into said mold cavity first region while closing off communication through said mold cavity third region between said mold cavity first and second regions;

(C) during at least a portion of step (B), co-injecting a flowable second material from a supply of said second material through said first gate along with said first material to fill said mold cavity first region with said second material substantially surrounded by said first material to define said first portion so that substantially all surfaces of said second material are in contact with said first material and so that said first and second materials are substantially non-destructively inseparable;

(D) after step (C), terminating the flow of at least said second material;

(E) establishing communication between said mold cavity first and second regions through said mold cavity third region;

(F) opening a second gate communicating directly between (1) one of said supplies of said first and second materials, and (2) one of said mold cavity second and third regions;

(G) injecting one of said first and second materials from said one of said supplies of first and second materials through said second gate to fill said mold cavity second and third regions to define said second and third portions, respectively;

(H) terminating the injection of said one of said first and second materials after said mold cavity second and third regions are filled with said one of said first and second materials and allowing said one of said first and second materials in said mold cavity third region to bond to said first material in said mold cavity first region at an interface between said mold cavity first and third regions; and (I) opening said mold to release the molded closure.

3. The product in accordance with claim 2 in which said first material is a skin material;

said second material is a core material; and steps (E) and (F) are effected simultaneously.

4. The product in accordance with claim 2 in which said first portion of said closure includes at least a portion of a body of said closure; and said second portion of said closure includes (1) a lid for engaging said body, and (2) at least a portion of a hinge connecting said body with said lid.

* * * * *